United States Patent [19]

Frey et al.

[11] Patent Number: 4,852,052

[45] Date of Patent: Jul. 25, 1989

[54] KELLY-TO-RISER POSITION DETERMINING SYSTEM WITH ADJUSTMENT FOR UNCOMPENSATED HEAVE

[75] Inventors: James E. Frey; William Stohrer-Hoyt, both of Middletown, Conn.

[73] Assignee: Teleco Oilfield Services Inc., Meriden, Conn.

[21] Appl. No.: 55,451

[22] Filed: May 28, 1987

[51] Int. Cl.$^4$ ............... E21B 44/00; E21B 19/09; E21B 15/02

[52] U.S. Cl. .................. 364/422; 73/151.5; 175/7; 175/40

[58] Field of Search .............. 73/151.5; 175/7, 40; 364/420, 422, 550

[56] References Cited

U.S. PATENT DOCUMENTS

| | | | |
|---|---|---|---|
| 4,085,509 | 4/1978 | Bell et al. | 175/7 X |
| 4,104,608 | 8/1978 | Melling et al. | 367/12 |
| 4,466,488 | 8/1984 | Nayler et al. | 175/7 |
| 4,535,972 | 8/1985 | Millheim et al. | 254/277 |

Primary Examiner—Clark A. Jablon
Attorney, Agent, or Firm—Fishman, Dionne & Cantor

[57] ABSTRACT

A system for determining kelly-to-riser position on floating drilling platforms is presented. The system removes (e.g. filters) uncompensated heave from surface sensor measurements so that bit depth can be accurately calculated. During operation, surface sensors on the drilling platform measure heave compensator action and kelly movements. Each heave sensor reading is then added to a kelly sensor reading in order to obtain a value termed kelly-to-riser. Each kelly-to-riser value is fed (inputted) into the system of the present invention and a filtered reading is returned for use in calculating bit depth and rate of penetration (ROP). The filtering system is termed a linear extrapolative filter (LEF). The LEF generates filtered readings by performing a linear regression on measurements taken over its pre-specified filter interval. It then predicts the current kelly-to-riser position from the resultant trend line.

28 Claims, 8 Drawing Sheets

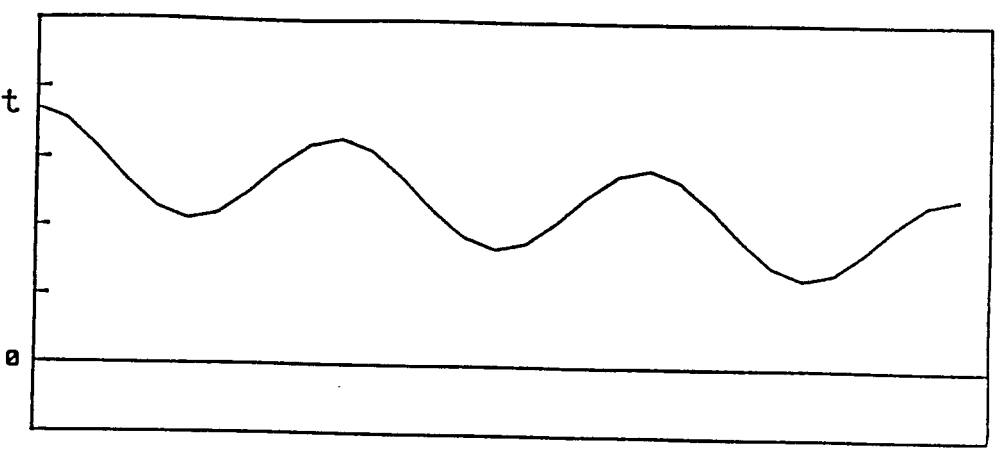
FIG. 2a Kelly Ht
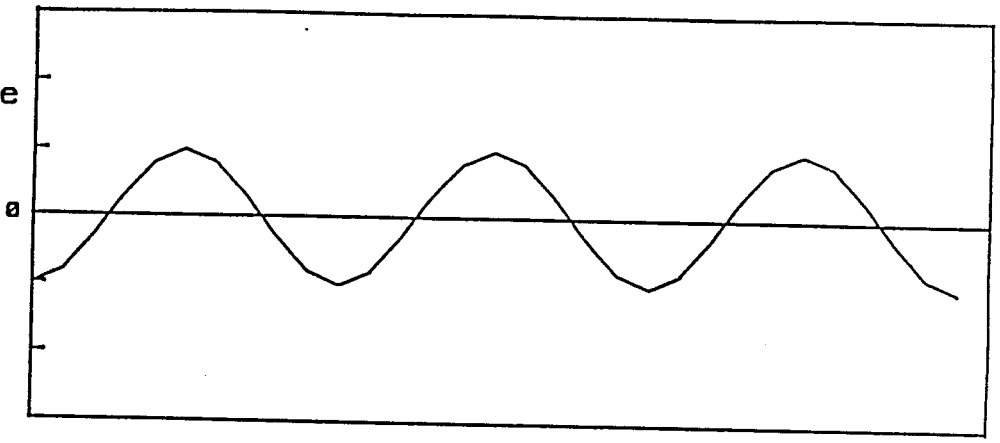
FIG. 2b Heave
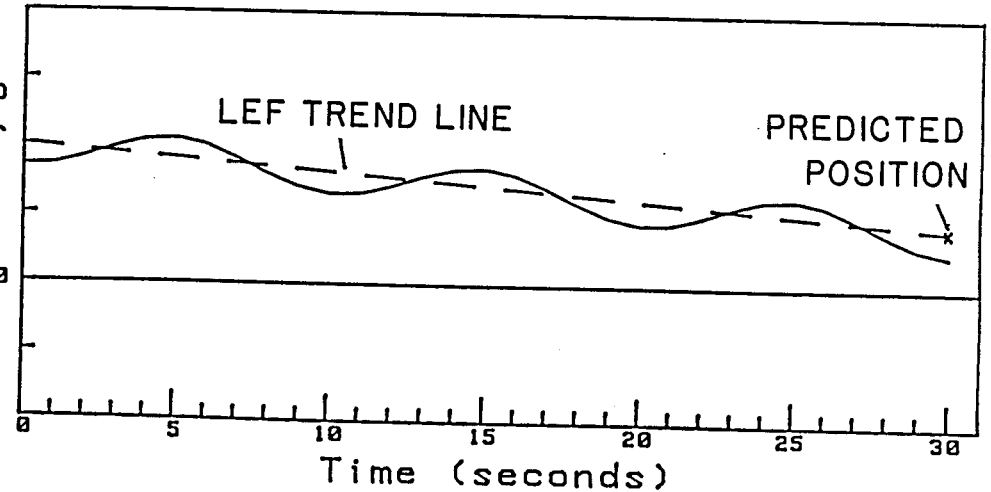
FIG. 2c Kelly to Riser
LEF TREND LINE
PREDICTED POSITION
Time (seconds)

KELLY-TO-RISER POSITION DETERMINING SYSTEM WITH ADJUSTMENT FOR UNCOMPENSATED HEAVE

BACKGROUND OF THE INVENTION

This invention relates to a system embodied in a data processor for solving depth tracking problems on floating drilling platforms. More particularly, this invention relates to a system for performing a linear regression on a history of accumulated kelly and heave measurements whereby accurate predictions of bit depths are achieved.

Accurate depth tracking (e.g. bit depth) on floating drilling rigs has long been a difficult task. An ocean surface's dynamic qualities (e.g., waves and tidal action) introduce many variables to any depth tracking system that incorporates heave motion. Compensation systems which are attached to a fixed point (the drilling riser) help reduce the degree to which wave motion is transmitted to the drilling mechanism (the kelly). In doing so, they provide a measurable motion (heave). If all motions were ideal, tracking would be simple. Unfortunately, inefficiencies in the compensators, drillstring stretch, and non-periodic heave motions all contribute to producing a high degree of variability in directly measured values. These problems cause a great deal of difficulty when attempting to correctly calculate the total drilling depth (bit depth) at any given time.

Several solutions to this problem have been considered. Most prior art methods introduce inaccuracies due to either invalid assumptions or by not including critical motions. For example, long-term depth changes due to tide action are not taken into account. One prior art system simply assumed that adding heave to kelly readings would cancel out all heave effects. However, this system experienced a repeating oscillation between on-bottom and off-of-bottom drilling states. This resulted in widely varying Rate of Penetration (ROP) and Weight on Bit (WOB) values, and also a loss of plotted MWD (measurement-while-drilling) data due to depth ordering errors. Still another prior art system comprising a time average filter. The input to the filter is the sum of the heave and kelly sensor readings. The output of the filter includes an "on-bottom clamp" that reduces off-bottom time. The time average filter takes a simple average of the last x seconds data and produces an update for each input. However, this simple average can be quite inaccurate.

SUMMARY OF THE INVENTION

The above-discussed and other problems and deficiencies of the prior art are overcome or alleviated by the system for solving depth tracking problems on floating drilling platforms of the present invention. The present invention comprises a system embodied in a data processor which removes uncompensated heave from sensor measurements which are used to calculate bit depth on floating drilling platforms. This system is termed a Linear Extrapolative Filter (LEF).

In accordance with the present invention, surface sensors measure heave compensator action and kelly movements. Each heave sensors reading is added to a kelly height sensor reading in order to obtain a value termed kelly-to-riser. Each kelly-to-riser value is fed into the LEF and a filtered reading is returned for use in calculating bit depth and rate of penetration (ROP). The LEF generates filtered readings by performing a linear regression on measurements taken over its pre-specified filter interval. It then predicts the current kelly-to-riser position from the resultant trend line.

Effective use of the LEF depends on proper data coverage of the heave wave forms. Data is acquired from the sensors preferably on one second intervals, which spreads the ten second average (nominal) heave wave over ten readings. The LEF's efficiency and accuracy are maximized if some whole number of exact heave periods is used as its filter interval in order to compensate for small non-periodic variations. For this reason, in a preferred embodiment, three average (ten second) heave periods are included, comprising a 30 second filter interval.

Non-uniform movements of the floating rig can often generate erroneous upward trends in the LEF's output. Accordingly, in a preferred embodiment, a software clamp is used to differentiate between slow movements that are witheld from output (e.g., caused by wave action or rig pitch and roll) and fast movements that are allowed to pass (e.g., the driller pulling the drillstring off of bottom).

Another preferred implementation feature is used to control the LEF's output. When data points exhibit a trend of downward velocities that are slowing (a negative acceleration), the filter would wrongly extrapolate to a point beyond the lowest actual value. Whenever this occurs, a braking function cancels the "momentum" that the unwanted trend creates by purging the LEF's buffer with constant values.

The novel depth tracking system of the present invention also has tide tracking capabilities. In order to correct all depths to mean sea level, which is the standard for most drilling operations, current tide and rig attitude data can be entered during calibration.

Significantly, the LEF is flexible enough to operate with or without a heave sensor input, by virtue of the fact that its multi-period design cancels out most periodical movements.

The above-discussed and other features and advantages of the present invention will be appreciated and understood by those skilled in the art from the following detailed description and drawings.

BRIEF DESCRIPTION OF THE DRAWINGS

Referring now to the drawings, wherein the like elements are numbered alike in the several FIGS.:

FIG. 2A–C are graphical plots of Kelly height, Heave and Kelly-to-Riser measurements, respectively, used as data inputs in accordance with the system of the present invention;

DESCRIPTION OF THE PREFERRED EMBODIMENT

Figure 1:
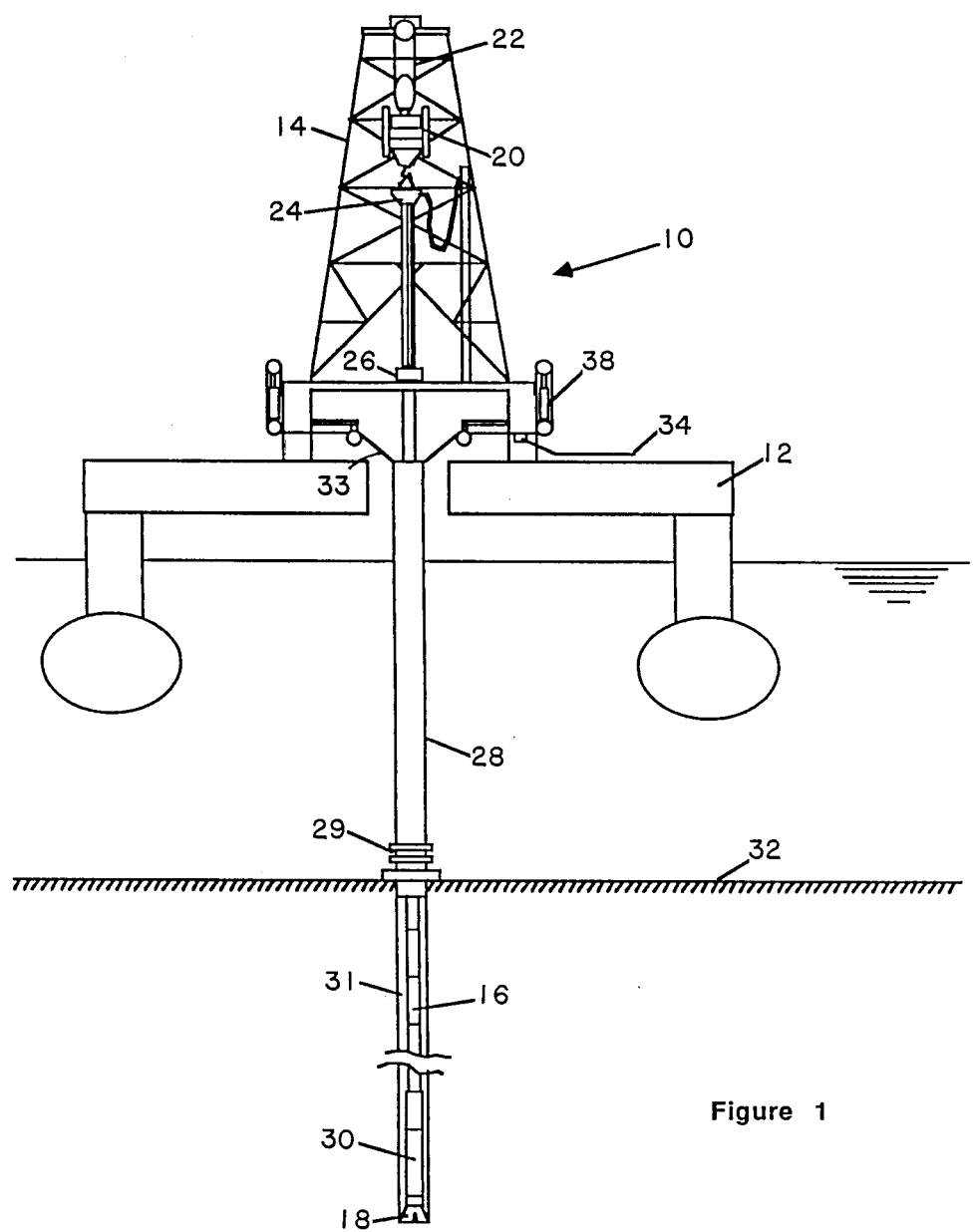
FIG. 1 is a diagrammatic view of a floating drilling rig.

Referring first to FIG. 1, a well known floating drilling rig is shown generally at 10. Rig 10 comprises a floating drilling platform 12 having a derrick 14 supported thereon. Derrick 10 supports a drillstring or drill stem 16 which terminates in a drill bit 18. As is well known in the art, the entire drillstring may rotate, or the drillstring may be maintained stationary and only the drill bit rotated, either of which may be the environment of the present invention. The drillstring 16 is made up of a series of interconnected segments, with new segments being added as the depth of the well increases. The drillstring is suspended from a movable or traveling block 20 of a winch system 22, and the entire drillstring may be driven in rotation by a square kelly 24 which slidably passes through but is rotatably driven by the rotary table 26 at the foot of the derrick. A motor assembly (not shown) is connected to operate both winch 22 and rotatably drive rotary table 26. A drilling riser 28 comprises a conduit which is annularly arranged about drill string 16. Riser 28 is fixed in place by direct attachment to a well head 29 which is secured to sea floor 32.

The lower part of drillstring 16 may contain one or more segments of larger diameter and thicker walls (e.g. bottom hole assembly 30) than other segments of the drillstring (known as drill collars). As is well known in the art, bottom hole assembly 30 may contain sensors and electronic circuitry for sensors, and power sources, such as mud driven turbines which drive drill bits and/or generators and, to supply the electrical energy for the sensing elements. Drill cuttings produced by the operation of drill bit 18 are carried away by a mud stream rising up through the free annular space 31 between the drillstring and the wall of the well. The mud column in drillstring 16 may serve as the transmission medium for carrying signals of downhole parameters to the surface. This signal transmission is accomplished by the well known technique of mud pulse generation whereby pressure pulses are generated in the mud column in drillstring 16 representative of sensed parameters down the well. The drilling parameters are sensed in a sensor unit in bottom hole assembly 30 near or adjacent to drill bit 18. Pressure pulses are established in the mud stream within drillstring 16, and these pressure pulses are received by a pressure transducer and then transmitted to a signal receiving unit which may record, display and/or perform computations on the signals to provide information on various conditions down the well.

As mentioned, accurate depth tracking (bit depth) on floating rigs is difficult to measure in real time. An ocean surface's dynamic qualities (e.g., waves, rig attitude, and tides) introduce many variables to any depth tracking system. In order to factor in the dynamic environment of the floating drilling rig relative to the drill bit depth, known compensation systems are used. These compensation systems are attached to a fixed point (the drilling riser 28) to help reduce the degree to which wave motion is transmitted to the drilling mechanism (the kelly 24). In so doing, they provide a measurable motion (heave). In FIG. 1, the compensation system is comprised of the rucker lines 33, the riser tensioners 38 and the compensated traveling block 20. The rucker lines transmit motions of rig 10 relative to the riser 28 to the riser tensioners 38 where they are converted by hydraulic pressure. This hydraulic pressure is transferred to the compensated traveling block 20 which acts on the kelly 24 to move it up or down in relation to vertical displacement caused by the rolling and pitching of rig 10.

Sensors are provided on platform 12 to measure the heave compensation system. These sensors include a heave sensor 34 which is placed on rucker line 33 for measuring the vertical displacement caused by waves; a kelly sensor (not shown) for measuring kelly height 24 and a hookload sensor (not shown) which is mounted on the drill line 22 for determining hookload (tension) on the drill string 16.

Unfortunately, inefficiencies in the compensators, drill string stretch and non-periodic heave motions all contribute to producing a high degree of variability in directly measured values. As a result, the compensation system will not completely compensate heave leading to a certain degree of "uncompensated heave". These problems cause a great deal of difficulty when attempting to correctly calculate the total drilling depth (bit depth) at any given time.

The present invention utilizes a data processing system which removes (e.g. filters) uncompensated heave from sensor measurements so that bit depth can be accurately calculated. Turning to FIGS. 2A-C, surface sensors 34 and 36 measure heave compensator action and kelly movements (FIGS. 2A and 2B). Each heave sensor reading is then added to a kelly sensor reading in order to obtain a value termed kelly-to-riser (FIG. 2C). Each kelly-to-riser value is fed (inputted) into the system of the present invention and a filtered reading is returned for use in calculating bit depth and rate of penetration (ROP). The filtering system is termed as linear extrapolative filter (LEF). The LEF generates filtered readings by performing a linear regression on measurements taken over its pre-specified filter interval. It then predicts the current kelly-to-riser position from the resultant trend line as shown in FIG. 2C. The LEF's efficiency and accuracy are maximized if some whole number of exact heave periods is used as its filter interval. Accordingly, in a preferred embodiment, three average (ten second) heave periods are included, comprising a 30 second filter interval (see FIG. 2C).

Figure 3:
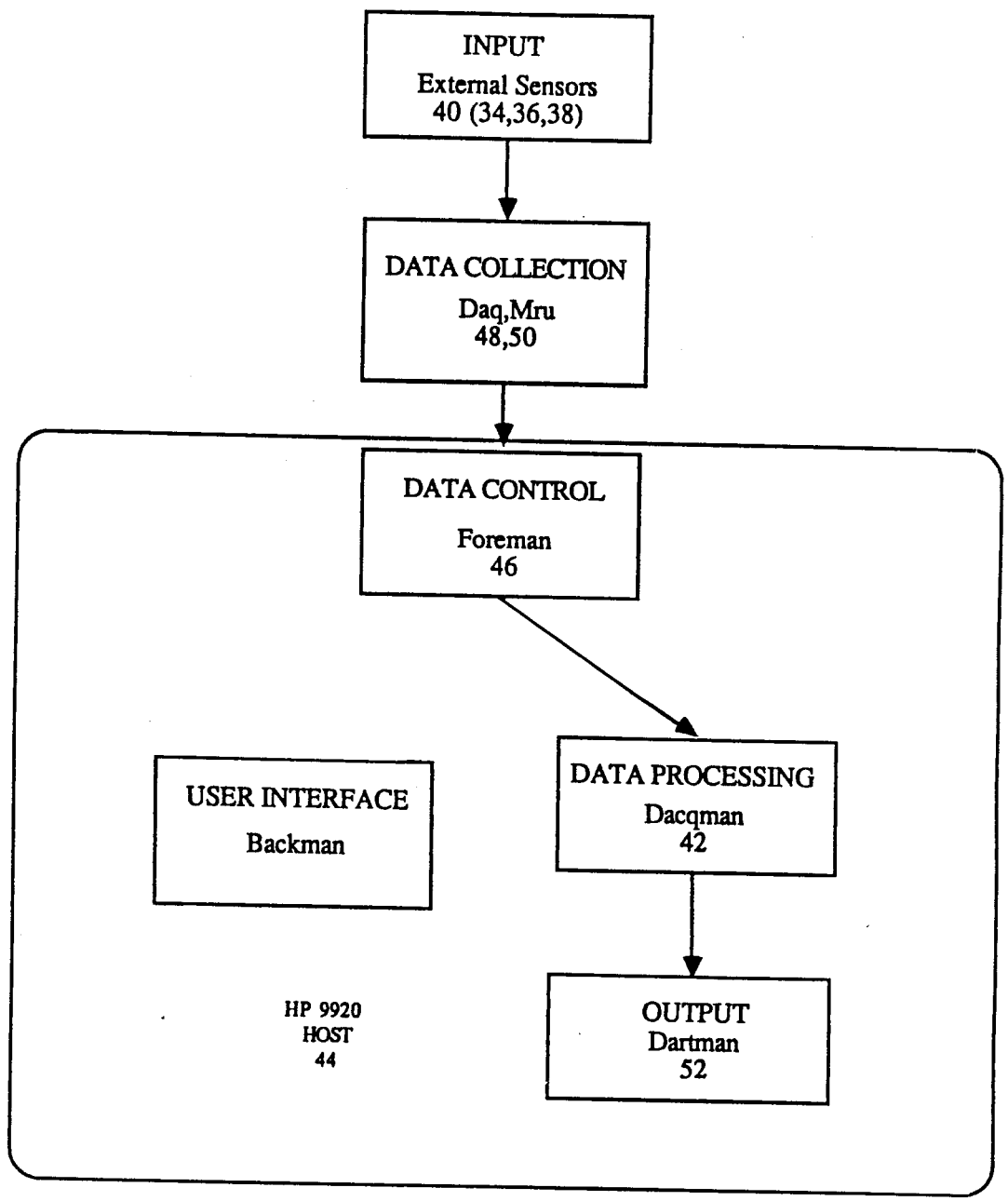
FIG. 3 is a flow chart diagram of a general system which utilizes the system of the present invention as a component thereof.
Figure 4:
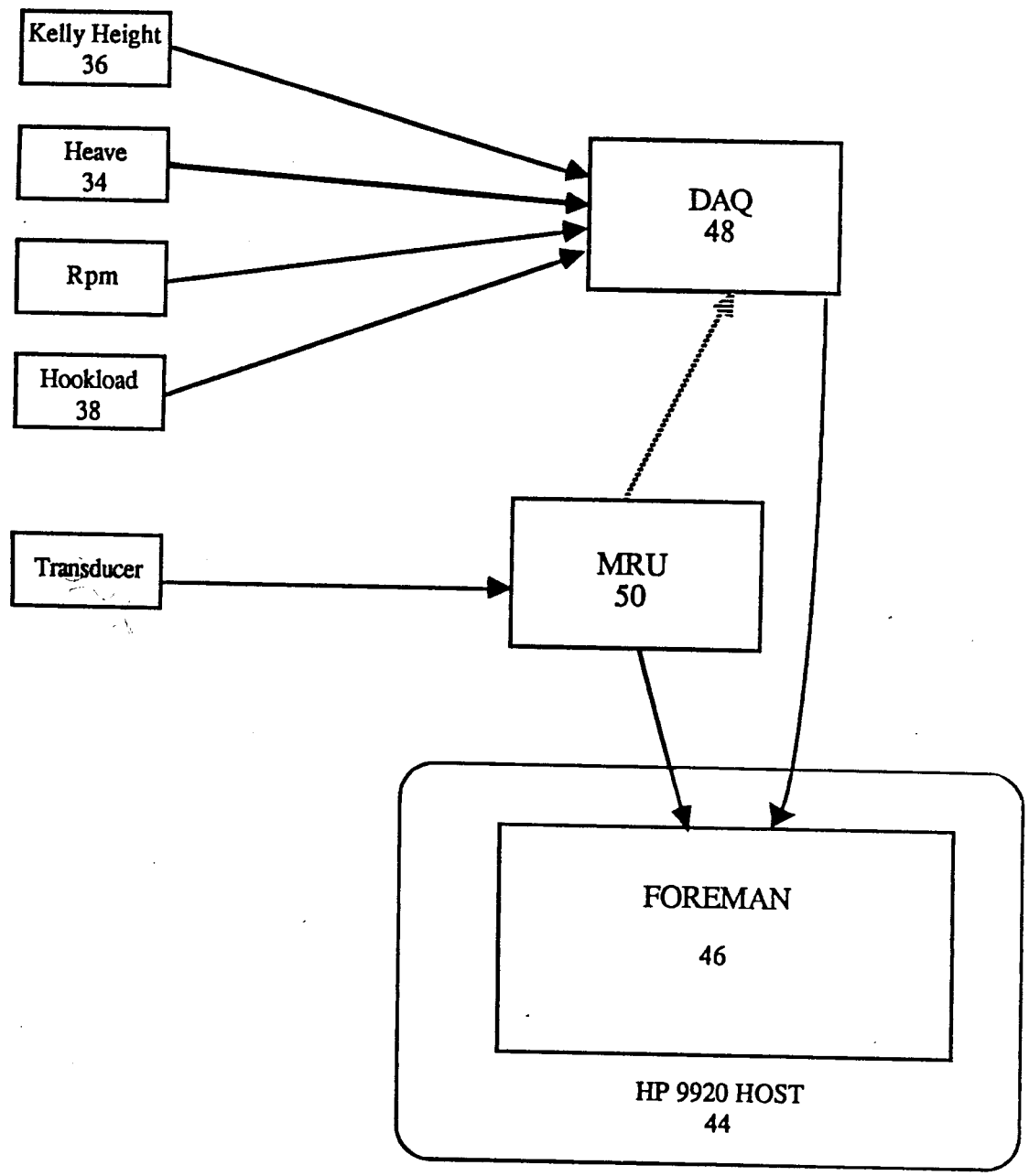
FIG. 4 is a flow chart diagram of the real time inputs acquired from sensors on the floating drilling rig of FIG. 1 which are used with the system of the present invention.
Figure 5:
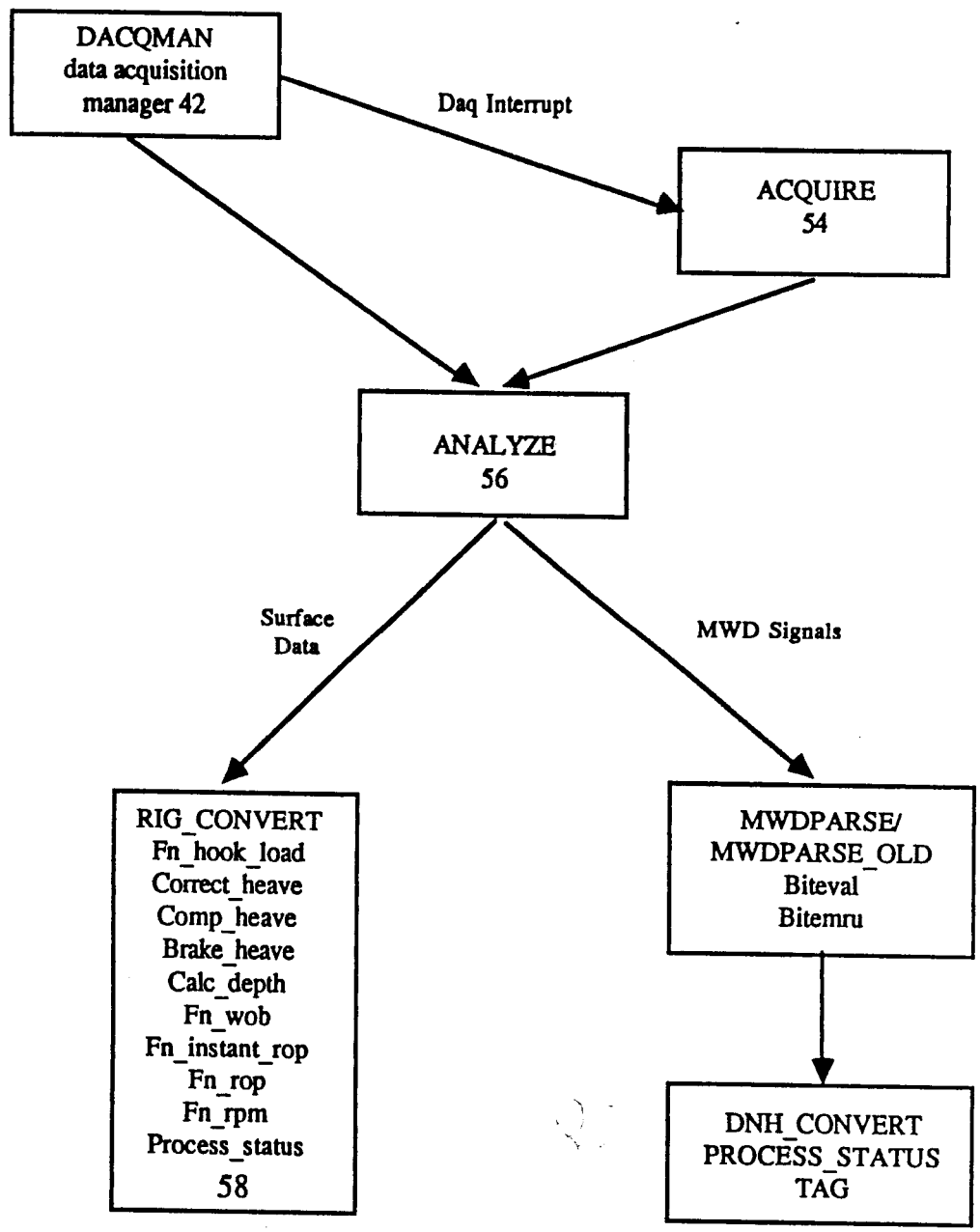
FIG. 5 is a flow chart diagram of the real time data processing system which includes the system of the present invention.

Referring now to FIGS. 3-5, the linear extrapolative filter of the present invention is contained in a package of software called M-series (which is part of a measurement-while-drilling (MWD) system employed by Teleco Oilfield Services, Inc., assignee of the present invention). This package consists of background and foreground (real time) systems. The LEF is a part of the foreground system. The general structure of the foreground system which provides the environment for the LEF is shown in FIGS. 3-5.

As can be seen in FIGS. 3 and 4, heave data and other measured inputs 40 (kelly height, heave, speed of rotating drill string (Rpm) and hook load) are received from the external sensors (e.g. kelly height sensor 36, heave sensor 34, hook load sensor 38), collected and routed through a subroutine 42 called DACQMAN (Data Acquisition Manager) to be analyzed for processing in a computer 44. The object code (including explanations thereof) for DACQMAN is attached hereto as Table 1.

A sub-routine labeled FOREMAN (Data Control 46) controls all interrupt-initiated activity. As is clear from a review of the object code for FOREMAN set forth in Table 2, this system receives and processes data from DAQ (Data Acquisition Unit) 48 and the MRU (MWD Receiving Unit 50) by calling DACQMAN 42, and then outputs it by calling DARTMAN (Data retrieval manager) 52.

Referring to FIG. 5, a sub-routine called ACQUIRE 54 is used to control the gathering of DAQ sensor readings and to refresh the DAQ instruction sequence. The object code (including explanation thereof) for ACQUIRE is set forth in Table 3. The ANALYZE program 56 then, in turn, calls RIG CONVERT 58 (FIG. 6) which executes the majority of the surface data processing. ANALYZE 56 manages the filtering and interpretation of all acquired data. The object code (and explanations thereof) for ANALYZE is set forth in Table 4.

Figure 6:
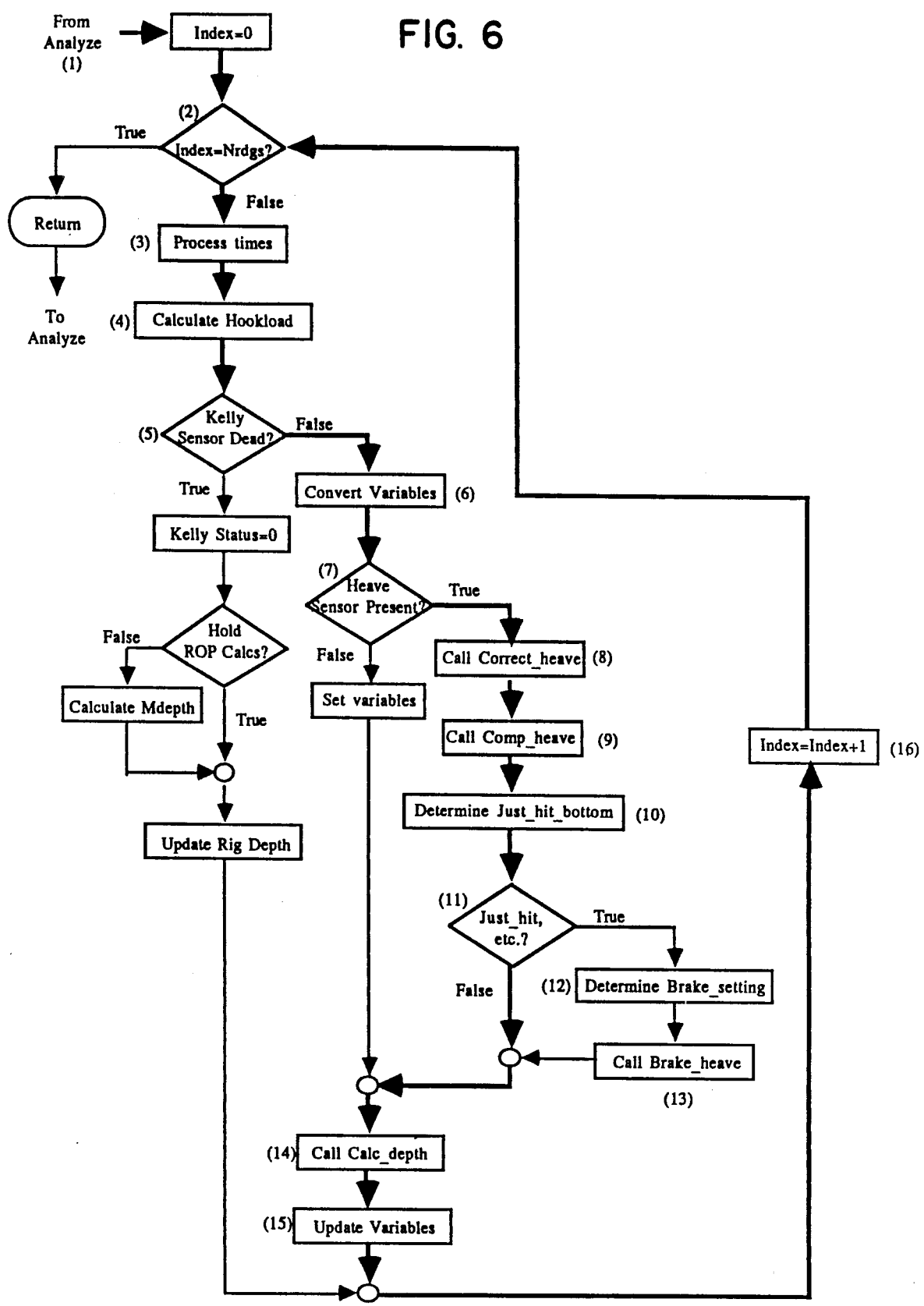
FIG. 6 is a flow chart diagram of the sub-routine RIG CONVERT which shows the system of the present invention.

Referring now to FIG. 6, a flow chart diagram is shown for the RIG CONVERT System. RIG CONVERT contains the actual calls to the LEF and its supporting routines. The objective of RIG CONVERT is to analyze surface sensor readings and produce calculate parameters. The object code (and explanations thereof) for RIG CONVERT is set forth in Table 5. It will be appreciated that those numbers that follow which appear in parentheses (#) reference portions of the object codes and flow charts being discussed.

This procedure (RIG CONVERT) is written in PASCAL, and will process the data passed to it from the BASIC routine named ANALYZE (Table 5). As part of the calling sequence, kelly height and heave data enter as the arrays named heave and khght (1). These arrays and others of the same type that are passed along with them contain five readings each, taken on one second intervals.

After local declarations and initializations, some maintainence is performed on rate-of-penetration control flags, and then the main processing loop is begun (2). This loop will execute the number of times required to process all data passed into the routine.

The first operations involve calculations of each individual measurement time (3) and then conversion of the hookload value into an easily usable form (4).

The first major decision is reached next, and asks whether or not the kelly sensor is dead (not present) (5). If it is not present, then depth calculations are performed and the loop is completed. If it is present, then individual values are pulled from the data arrays for further analysis (6).

The next major decision is reached at (7), where the presence of a heave sensor is checked. If a heave sensor is indeed present, then the LEF is put into use.

Firstly, the heave reading is corrected to mean sea level through CORRECT-HEAVE (8) (see object code and explanations thereof in Table 6.). CORRECT-HEAVE allows the depth tracking routines to follow tidal changes and correct all calculated depths to mean sea level. This corrected value is then forwarded along with the current kelly reading to the LEF, which is located in COMP-HEAVE (9) (see object code and explanation thereof in Table 7 and flow diagram of FIG. 7). The LEF will output a global variable, named Last-position, and will also return the current drilling velocity.

The LEF's output must be controlled under certain circumstances. In order to check for these conditions, several variables are investigated. Firstly, it is important to determine whether or not this set of readings signifies the start of actual forward drilling (10). Next, this Just-hit-bottom condition is checked in conjunction with both the drilling velocity, as calculated by the LEF, and flags indicating recalibration status and tripping (non-drilling) status (11).

Figure 8:
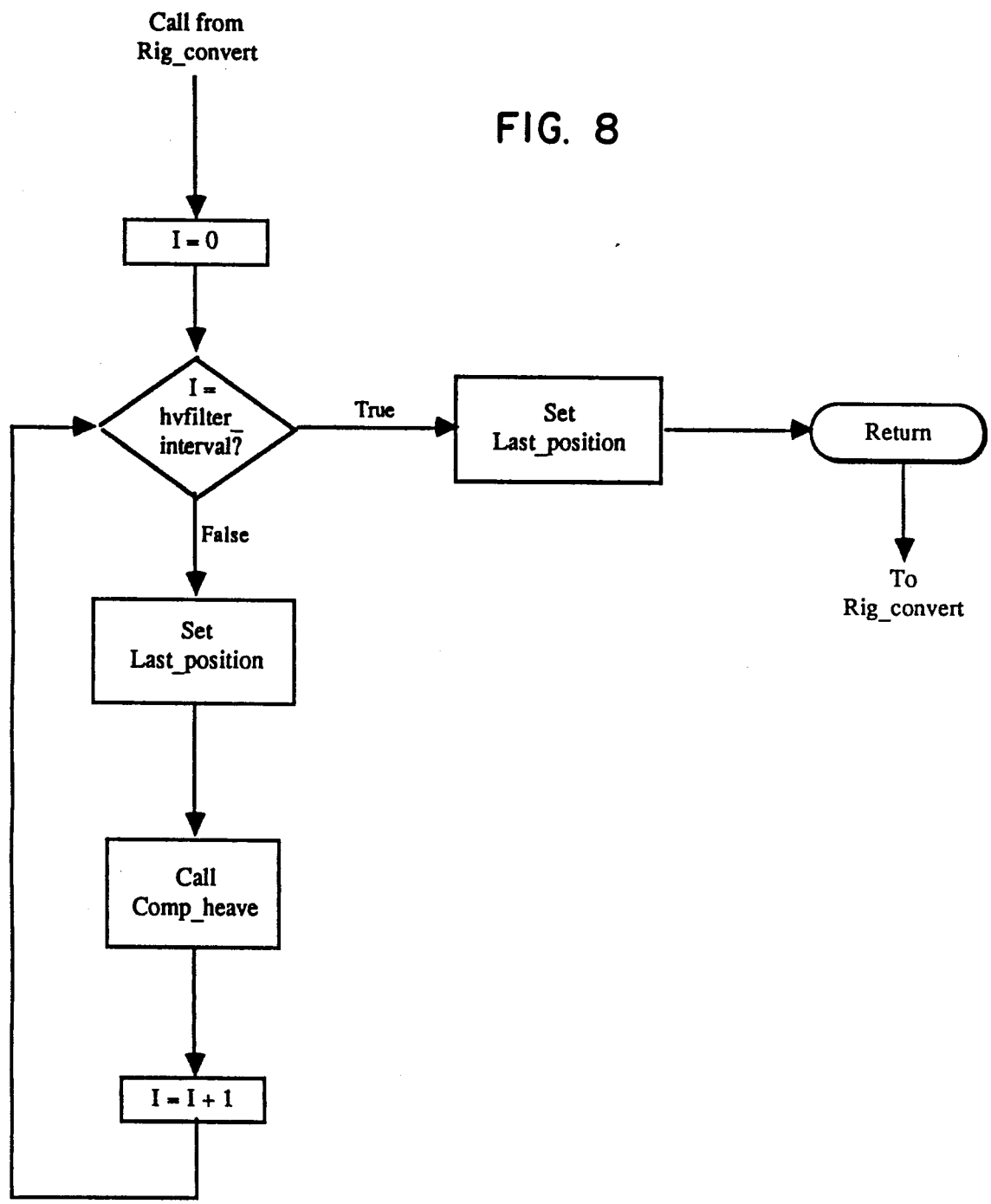
FIG. 8 is a flow chart diagram of the sub-routine BRAKE HEAVE which forms a portion of the system of the present invention.

If these checks result positively, then the braking function will be used. First, the brake setting to be used is chosen depending upon the recalibration flag (12). Next, the braking function is called via BRAKE-HEAVE (13) (see object code and explanation thereof in Table 8 and the flow diagram of FIG. 8). This function will purge the LEF's data histories with constant values, thereby cancelling any momentum that may have been accumulated to this point. As is clear from a review of FIG. 8 and Table 8, BRAKE HEAVE is a routine that uses a constant and repeatedly calls COMP-HEAVE until the LEF's buffer has been completely flushed.

If the heave sensor was not present at step (7), then two necessary variables are intialized before calling the depth calculation routines.

The depth calculations which will utilize the LEF's filtered output are accessed through CALC-DEPTH (14) (see object code and explanation thereof in Table 9). CALC-DEPTH provides the interface between RIG-CONVERT and DEPTH-STATUS (see object code and explanation thereof in Table 10) for depth tracking and calculations. The primary output returned from CALC-DEPTH will be the value of bitdepth, along with several status flags. These outputs are then transferred into secondary arrays for late usage (15).

The remainder of the code in this (RIG CONVERT) routine consists of calculating several parameters from the data sets, and then updating the appropriate process control areas before completing the loop (16).

Figure 7:
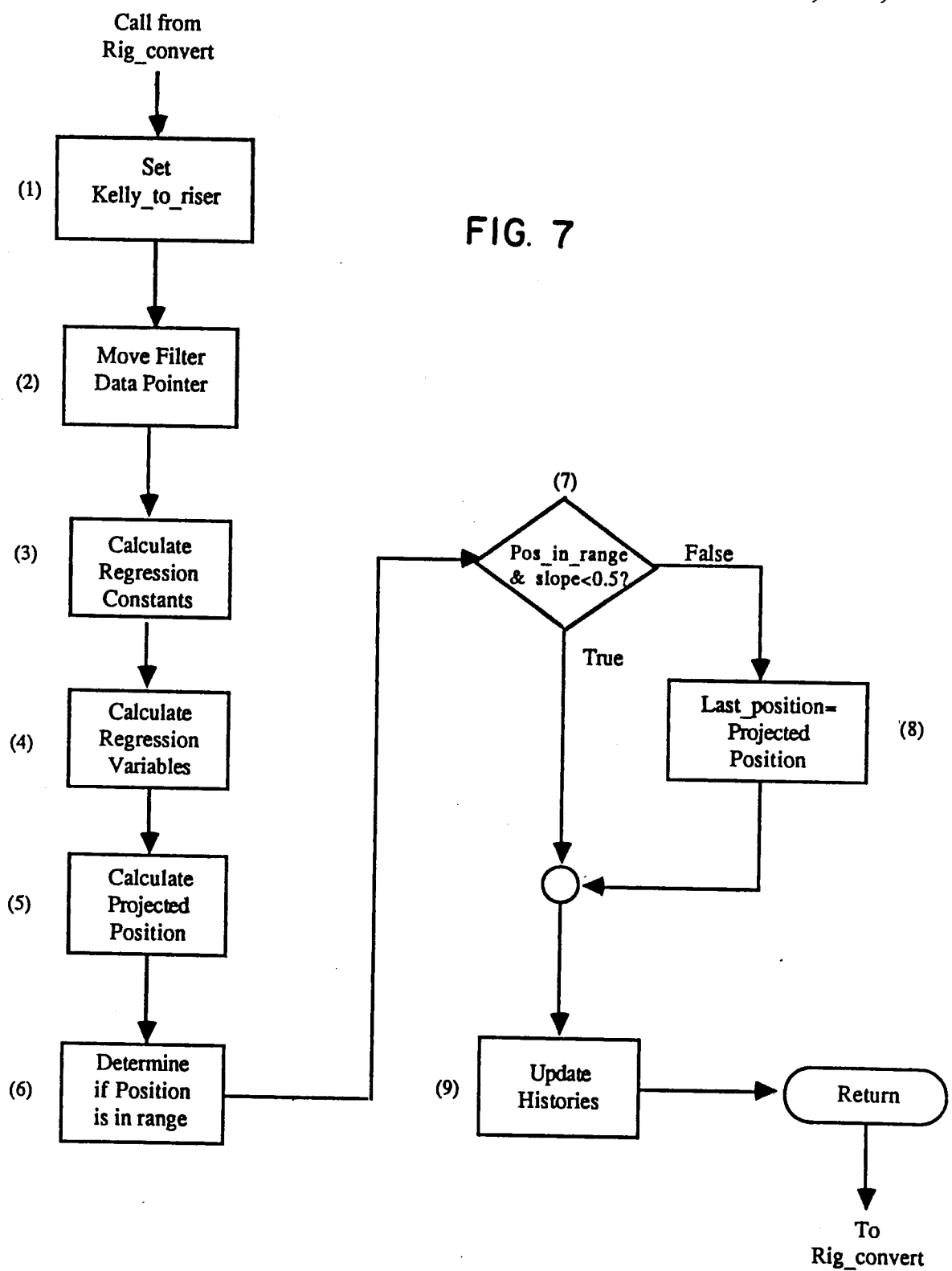
FIG. 7 is a flow chart diagram of the sub-routine COMP HEAVE which forms a portion of the system of the present invention.

As mentioned, the LEF is located in the COMP-HEAVE sub routine (refer to Table 7 and FIG. 7). The objective of COMP-HEAVE is to update kelly and heave data histories with the latest data points and to perform a least squares analysis on these histories which will produce a current filtered projection of kelly-to-riser (FIG. 2C). This resulting value will be used in subsequent depth calculations.

The COMP-HEAVE routine maintains histories of thirty heave and kelly readings each. Every time the routine is called, a pointer is updated in order to allow proper data control within the histories so that the newest data will replace the oldest data (2). Actual replacement will take place later, but first the old values must be retained for removal from the least squares sums.

The current measured kelly-to-riser value (FIG. 2C) is obtained by adding the kelly and heave readings that have been passed in from the calling routine (1). This term is created to simplify usages in the least squares analysis that is forthcoming.

The heart of the Linear Extrapolative Filter lies in the least squares analysis found in the next four stages. Four sums are required to complete the analysis, Sumx, Sumxx, Sumxy, and Sumy. For this application, x-axis will represent time, and y-axis will represent linear displacement. Since the data points are collected regularly on one-second intervals, the x sums can be easily and properly approximated with constants (3). Sumxy and Sumy involve usage of the kelly-to-riser data, and in calculating them a short cut is utilized which is also allowed by virtue of x-axis (time) assumptions (4). The four equations used in performing the least squares analysis preferably comprise the following:

(1) $\text{Sumx} = [(\text{interval}) \times (\text{interval}+1)] \div 2$ (2) $\text{Sumxx} = [(\text{interval}) \times (\text{interval}+1) \times (2 \times (\text{interval})+1)] \div 6$ (3) $\text{Sumxy} = \text{Sumxy} - \text{Sumy} + (\text{kelly-to-riser} \times \text{interval})$ (4) $\text{Sumy} = \text{Sumy} - [\text{Kelly (pointer)} + \text{heave (pointer)}] + \text{Kelly-to-riser}$ Where:

| | |
|---|---|
| Sumx, Sumxx, Sumy, Sumxy = | Least squares sums |
| Interval = | Filter sample interval = (hvfilter-interval) |
| Kelly-to-riser = | Current kelly added to heave |
| Kelly (*) = | History of kelly readings |
| Heave (*) = | History of heave readings |
| Pointer = | Current position within kelly and heave histories |

After all of the sums have been updated, the slope and intercept of the best fit line can be derived (5). These two parameters are subsequently used to obtain a projected kelly-to-riser value (6) (FIG. 2C). This value is projected to the current time, so that averaging lag is reduced to a minimum.

(5) $\text{Slope} = \{[(\text{Sumx}) \times (\text{Sumy}) \div (\text{interval})] - \text{Sumxy}\} \div \{[(\text{Sumx}) \times (\text{Sumxy}) \div (\text{interval})] - \text{Sumxx}\}$ (6) $\text{Intercept} = [(\text{Sumy}) \div (\text{interval})] - [(\text{slope}) \times (\text{Sumx}) \div (\text{interval})]$ Where:

Slope = slope of trend line

Intercept = intercept of trend line

Before this final value is used, some checks are run to determine whether or not this particular output will be passed along for depth calculations (7). Of primary concern is determining whether or not an apparent upward movement is due to actual drilling activity (such as pulling the drillstring off-of-bottom) or rather is due to uncompensated heave movements. If the checks are passed (motions are true drilling), then the projected value is assigned to Last-position (8). This global variable will carry the filtered value to the depth calculation routines (Tables 9 and 10). Lastly, the current kelly and heave data points are used to update their respective history arrays (9).

As discussed below, the LEF of the present invention has been successfully tested in both the lab and field.

Lab Testing

Three potential scenarios were created in lab testing of the routines. Firstly, synchronous heave and kelly motions (180 degrees out of phase) were input for use by the tracking system, representing the ideal situation. Secondly, asynchronous heave and kelly inputs were generated, producing phase differences ranging between 0 and 180 degrees. This tested both the most realistic, with phase differences near 180, and the most strenuous (but rare) cases when the motions were exactly in phase. Next, only heave-influenced kelly motions were input, simulating complete lack of a heave sensor. This last case was the most streneous that was expected in actual use of the tracking system. A multiple of rig activity simulations were conducted under each of these scenarios. Lastly, recordings of actual rig data were run through the system.

Field Tests

Following successful completion of lab testing, the routines were field tested in the Norwegian sector of the North Sea. Testing took place on four floating drilling rigs.

The most strenuous expected scenario devised in the lab was realized immediately. The first two tests began without heave sensors, as a surface hole was being drilled with sea water and no drilling risers were present to which the compensators could have been attached. The LEF worked so well that operators were able to accurately track depth even without installing the heave sensors when the risers were being used for later hole sections. The only disadvantage of operation in this manner was the loss of tide-tracking capabilities.

The third and fourth test were conducted with full compensators and tide tracking, as were the latter part of the first and second tests. The LEF proved itself during these tests as a highly useful method of heave compensated depth tracking. Operators reported only one miscalculated depth value from all four of these tests combined.

In summary, the Linear Extrapolative Filter (LEF) of the present invention is a data processing procedure that allows accurate depth tracking from floating rigs. The LEF has at least the following features:

1. ROP Measurement

A primary goal of the LEF is to properly measure ROP in real time while removing uncompensated heave from the depth measurements. To achieve this goal, the LEF establishes a trend line from measurements taken over the last n (e.g. 30) seconds. The filter then predicts the bit's current position from the trend line. The LEF is designed with no built-in delays, so that every depth reading immediately results in a filtered reading.

2. On-Bottom Clamp

The system incorporates a software on-bottom "clamp" that keeps the depth system on bottom if it sees small, slow movements (e.g., caused by wave action or rig pitch and roll). However, it immediately comes off bottom when it detects quick movements (e.g., the driller pulling off bottom).

3. HEAVE-BRAKE

The LEF system responds to kelly acceleration as well as velocity. The LEF sees any sudden velocity changes (like tagging bottom after a connection) and automatically hits a heave brake to prevent the depth system from "drilling ahead" of the driller (by producing incorrectly projected values).

4. Tidal Compensation/System Calibration

The LEF system is calibrated by inputting tidal data and rig ballast information. Thereafter, the system tracks tidal and ballast changes as drilling progresses and adjusts all depth readings to mean sea level (MSL). The system is periodically recalibrated by updating the tidal and ballast data.

5. Multi-Period Sampling Interval

The LEF samples heave and kelly sensors roughly every second which spreads the nominal heave period over 8 to 12 samplings. Several periods of the heave wave are included in the sample interval in order to cover most small variations from the true average and to increase the accuracy of the filter.

TABLE 1

```
!-----------------------------------------------------------------!
!                                                                 !
! Name:    Dacqman                                                !
!                                                                 !
! Purpose: Data acquisiton manager:                               !
!                   Acquire and Analyze real-time data.           !
!                                                                 !
! Type:                                                           !
!                                                                 !
! Invocation:                                                     !
!        Dacqman(Spurious_int,Daq_intr,Mru_intr,Mru_there)        !
!                                                                 !
! INTERFACE SUMMARY                                               !
!            (Name)         (Type)         (Description)          !
!                                                                 !
! Input:                                                          !
!     Daq_intr              integer        Presence of daq interrupt !
!                                                                 !
!     Mru_intr              integer        Presence of Mru interrupt !
!                                                                 !
!     Mru_there             integer        Presence of Mru in system !
!                                                                 !
! Output:                                                         !
!     Spurious_int          integer        Validity of interrupt, !
!                                                                 !
! Globals Variables:                       Contains:              !
!     COM /Mwdfmt/              Mwd transmission format data      !
!     COM /Systat/              System cycle time and activity flag !
!                                                                 !
! Invoking modules:                                               !
!     Foreman                                                     !
!                                                                 !
! Modules invoked:                                                !
!     Acquire                                                     !
!     Analyze                                                     !
!                                                                 !
!-----------------------------------------------------------------!
SUB Dacqman(INTEGER Spurious_int,Daq_intr,Mru_intr,Mru_there)
Dacqman:  ! Rev=1.5
   !
   !   Global Declarations:
   !
   COM /Mwdfmt/ Lbit,INTEGER Fmt(*),Fmtcnt,Fmtcode,Fmtptr,Pchk,Smplrate
   COM /Systat/ INTEGER Ncycle,Ocycle,Systart
   !
   !   Local Declarations:
   !
   INTEGER Nrdgs,Mwdpresent,Current_mwd
   ALLOCATE INTEGER Drevs(1:Ocycle),Heave0(1:Ocycle)
   ALLOCATE INTEGER Hld0(1:Ocycle),Khght(1:Ocycle)
   ALLOCATE Mwd(1:Smplrate*Ocycle)
   !
```

```
!   If the Data Acquisition Unit reports data to be read,
!       then enter the data through Acquire:
!
IF Daq_intr THEN
  Acquire(Mwd(*),Drevs(*),Heave0(*),Hld0(*),Khght(*),Nrdgs,
                            Spurious_int,Mwdpresent,Current_mwd)
END IF
IF Mru_intr THEN
  Mwdpresent=1
  Spurious_int=0
ELSE
  IF Mru_there THEN Mwdpresent=0
END IF
!
!   If any interrupts were valid, then process the data collected
!       through Analyze:
!
IF NOT Spurious_int THEN
  Analyze(Mwd(*),Drevs(*),Heave0(*),Hld0(*),Khght(*),Nrdgs,
                                  Mwdpresent,Current_mwd)
END IF
!
DEALLOCATE Drevs(*),Heave0(*),Hld0(*),Khght(*)
DEALLOCATE Mwd(*)
Ocycle=Ncycle
!
SUBEND
```

TABLE 2

```
!-------------------------------------------------------------------!
!                                                                   !
! Name:      foreman                                     No.        !
!                                                                   !
! Purpose:   To control all interrupt-initiated activity.           !
!                                                                   !
! Type:      re-entrant macro procedure                             !
!                                                                   !
! Invocation:   CALL Foreman                                        !
!                                                                   !
! INTERFACE SUMMARY                                                 !
!       (Name)           (Type)            (Description)            !
! Input:                                                            !
!       none                                                        !
!                                                                   !
! Output:                                                           !
!       none                                                        !
!                                                                   !
! Global Variables:                    Contains:                    !
!     COM /Bha/                        MWD tool type and sensor offsets !
!     COM /Dev_table/                  Peripheral Device information !
!     COM /Job_entries/                Current task identification  !
!     COM /Kelly/                      Depth tracking system data   !
!     COM /Mru_buffin/                 Data from Digital MWD signal !
!                                        processor                  !
!     COM /On_signal/                  Status of data processing cycle !
!     COM /Pdata_struct/               Current output data          !
!     COM /Rop_filter/                 Rate of penetration calculation !
!                                        control                    !
!     COM /Systat/                     Cycle lengths and system active !
!                                        flag                       !
```

```
!    COM /Target/                        Well target coordinates              !
!                                                                             !
! Global Constants:                                                           !
!    COM /Dev_index/                     Pointers to Dev_table array          !
!    COM /Dev_mon/                          "     "   "      "                !
!    COM /Dev_stat/                         "     "   "      "                !
!    COM /Periphb/                       Background peripheral I/O paths      !
!    COM /Periphf/                       Foreground    "       "    "         !
!                                                                             !
! Modules Invoked:                                                            !
!    Remote_in                                                                !
!    Dacqman                                                                  !
!    Dartman                                                                  !
!    Remote                                                                   !
!    Plotter_is                                                               !
!                                                                             !
!-----------------------------------------------------------------------------!
!
SUB Foreman
Foreman:!  Rev=1.24
   !
   !      Global Declarations......
   !
   COM /Bha/ Bitoff,Diroff,Gamoff,Resoff,Scrib,Tc,INTEGER Tool
   COM /Dev_index/ INTEGER Bus,State,Crlim,Mnlim,Mxlim,Init
   COM /Dev_mon/ INTEGER Printer,Remote,Scratch,Strip,Digit
   COM /Dev_mon/ INTEGER Micro_floppy,Ddial,Daq,Winch,Mru
   COM /Dev_stat/ INTEGER Dev_query,Dev_nok,Dev_ok,No_dev
   COM /Dev_table/ INTEGER Dev_table(*)
   COM /Job_entries/ INTEGER Host_job,Remote_job,Foregrnd_active
   COM /Kelly/ Mdpth,Newsingle,Ropasm,Slength
   COM /Kelly/ INTEGER Klydead,Klystat,Trip,Observe,Kly_ret_dir
   COM /Mru_buffin/ Mru_buffin$ BUFFER,@Mru_buffin,@Mru_in
   COM /On_signal/ INTEGER Onsignal
   COM /Pdata_struct/ Pdata(*),Pdata1(*),Time1
   COM /Periphb/ @Dig,@Scratch
   COM /Periphf/ @Lp,@Remote,@Strip,@Ddial
   COM /Rop_filter/ INTEGER Suppress_chg,Avg_reset
   COM /Systat/ INTEGER Ncycle,Ocycle,Systart
   COM /Target/ Slotx,Sloty,Slotz,Tx,Ty,Tz
   COM /Target/ Originx,Originy,Originz,Prop_azm
   !
   !      Local Declarations...
   !
   INTEGER Poll7,Poll8,Spurious_int,Poll18
   INTEGER Fg_plotter,Bg_plotter,System_restart
   INTEGER Com_stat,Daq_intr,Mru_there
   !
   Foregrnd_active=1
   Fg_plotter=1
   Bg_plotter=2
   System_restart=5100
   !
   !
   ! Parallel Poll bus 7, 8, and 18 (Data acquisition, printer, and
   !    remote computer) to obtain status of interrupts.
   !
   ON ERROR GOTO Bus7_failed
   ON TIMEOUT 7,.5 GOTO Bus7_failed
   Poll7=PPOLL(7)
```

```
        OFF TIMEOUT 7
Bus7_failed:!
   OFF ERROR
   ON ERROR GOTO Bus8_failed
   ON TIMEOUT 8,.5 GOTO Bus8_failed
   Poll8=PPOLL(8)
   OFF TIMEOUT 8
Bus8_failed:      !
   OFF ERROR
   IF Dev_table(Remote,State)<>No_dev THEN
      ON ERROR GOTO Bus18_failed
      ON TIMEOUT 18,.5 GOTO Bus18_failed
      Poll18=PPOLL(18)
      ENABLE INTR 18
      OFF TIMEOUT 18
Bus18_failed:      !
      OFF ERROR
   END IF
   !
   !
   !  Get data from the remote if it interrupted.
   !
   IF BIT(Poll18,0) THEN
      IF Dev_table(Remote,State)<>No_dev THEN
         Remote_in(@Remote,Remote_job,Suppress_chg,Avg_reset,
                  Tool,Trip,Bitoff,Mdpth,Scrib,Pdata(*),
                  Pdata1(*),Time1,Slength,Tx,Ty,Tz,Tc )
      ELSE
         ENTER Dev_table(Remote,Bus)
      END IF
   END IF
   !
   !
   !  Get data from the DAQ (Data Acquisition Unit) and the MRU (MWD
   !  Recieving Unit) by calling Dacqman, and then process it (printed
   !  log, plotted log, and database) by calling Dartman (Data retrieval
   !  manager).  Also send data to the remote system if required.
   !
   Plotter_is(Fg_plotter)
   IF Dev_table(Mru,State)<>No_dev THEN
      STATUS @Mru_in,0;Com_stat
      Mru_there=1
   ELSE
      Mru_there=0
      Com_stat=0
   END IF
   Daq_intr=BIT(Poll7,6)
   IF Daq_intr OR Com_stat THEN
      Dacqman(Spurious_int,Daq_intr,Com_stat,Mru_there)
      IF Systart AND NOT Spurious_int THEN
         Dartman
         Remote(Remote_job,Tool,Trip,Bitoff,Mdpth,Slength,Pdata(*),
                  Pdata1(*),Time1,Scrib,Tx,Ty,Tz,Tc)
      END IF
   END IF
   !
   !
   !  Warn operator if and when the printer runs out of paper.
   !  Also be sure that if the system is being restarted, that
   !  it's plotter assignment is intact.
```

```
!
IF BIT(Pol18,6) AND Dev_table(Printer,State)<>No_dev THEN
   Warn("SYS: Printer is out of paper!")
END IF
IF Host_job<>System_restart THEN
   Plotter_is(Bg_plotter)
END IF
!
!
! Reenable all interrupts.
!
ENABLE INTR 7
Foregrnd_active=0
Onsignal=0
!
!
SUBEND
```

TABLE 3

```
!---------------------------------------------------------------!
!                                                               !
! Name:     acquire                                      No.    !
!                                                               !
! Purpose:  To control the gathering of DAQ sensor readings, and to
!           refresh the DAQ instruction sequence.
!
! Type:     macro,procedure:re-entrant,re-usable
!
! Invocation:
!       Acquire(Mwd(*),INTEGER Drevs(*),Heave0(*),Hld0(*),Khght(*),
!                Nrdgs,Spurious_int,Mwdpresent,Current_mwd)
!
!
! INTERFACE SUMMARY
!       (Name)            (Type)              (Description)
!
! Input:
!     none (all passed parameters will be outputs)
!
! Output:
!       Mwd(*)            real array          Raw mwd pressure pulse rdngs
!                                             from front end board
!
!       Drevs(*)          integer array       Block of rpm readings
!
!       Heave0(*)         integer array       Block of heave readings
!
!       Hld0(*)           integer array       Block of hookload readings
!
!       Khght(*)          integer array       Block of kelly hght readings
!
!       Nrdgs             integer             Number of rdgs in block
!
!       Spurious_int      integer             Validity of interrupt
!
!       Mwdpresent        integer             Mwd readings were recv'd
!
!       Current_mwd       integer             Mwd readings taken during
!                                             current acquire cycle
!
```

```
! Global Variables:              Contains:
!       COM /Daqtime/              Data Acquisition time information
!       COM /Dev_table/            Peripheral Device status and info
!       COM /Diag/                 Diagnostic display data
!       COM /Mwdfmt/               MWD format info and tooltype
!       COM /Mwd_int/              MWD data presence flag
!       COM /Reset/                Clock reset flag
!       COM /Systat/               System cycle times and active flag
!
! Global Constants:
!       COM /Daq/                  I/O paths to data acquisition unit
!       COM /Daqcards/             Card locations within daq
!       COM /Dev_index/            Pointers to Dev_table array
!       COM /Dev_mon/
!       COM /Dev_stat/
!
! Modules Invoked:
!   Warn
!   Dho_reset
!   Acqtime
!
! Invoking Modules:
!   Dacqman
!
!--------------------------------------------------------------------
!
SUB Acquire(Mwd(*),INTEGER Drevs(*),Heave0(*),Hld0(*),Khght(*),Nrdgs,
                              Spurious_int,Mwdpresent,Current_mwd)
Acquire: ! Rev=D1_18
    !
    !      Global Declarations:
    !
    COM /Daq/ @Daq,@Il,@Mi,@Rv,@Srq,@Rc,@Errn
    COM /Daqcards/ Iseq$,INTEGER Ad,Hc,Hvc,Kc,M1,M2,Rc,Tp
    COM /Daqtime/ Daqclok(*),Daqtime_set,Sample_interval(*)
    COM /Dev_index/ INTEGER Bus,State,Crlim,Mnlim,Mxlim,Init
    COM /Dev_mon/ INTEGER Printer,Remote,Scratch,Strip,Digit,Mru,Daq
    COM /Dev_stat/ INTEGER Dev_query,Dev_nok,Dev_ok,No_dev
    COM /Dev_table/ INTEGER Dev_table(*)
    COM /Diag/ Diagmwd(*),INTEGER Update
    COM /Mru_adjust/ INTEGER Mru_adj,REAL Maxtime,Maxvoltage
    COM /Mwdfmt/ Lbit,INTEGER Fmt(*),Fmtcnt,Fmtcode,Fmtptr,Pchk,Smplrate
    COM /Mwd_int/ INTEGER Mwd_interrupt
    COM /Rev_klycd/ Kelly_distance,INTEGER Calib_klycd,Change_ret_dir
    COM /Reset/ INTEGER Clock_reset
    COM /Rop_filter/ INTEGER Suppress_change,Avg_reset
    COM /Systat/ INTEGER Ncycle,Ocycle,Systart
    !
    !      Local Declarations:
    !
    INTEGER A,B,C,D,Days,Diff_counter,Hours,I,Minutes,Err_num,Mem_stat
    DIM Reading_time(0:10)
    !
    !      Initialize variables....
    !
    Nrdgs=0
    Current_mwd=0
    Mwdpresent=0
    Spurious_int=1
    !
```

```
!       Set DAQ timeout failure route.
!
ON TIMEOUT 7,1 GOTO Deaddaq
!
!       Disable further interrupts so that data can be collected:
!
IF Dev_table(Mru,State)=No_dev OR Mru_adj THEN
   OUTPUT @Daq USING "K";"GI,DC,";M2;"T,GN"
END IF
!
!  Serial Poll DAQ mainframe to acknowledge SRQ (status request).
!
A=SPOLL(@Daq)
IF A<>64 THEN
   Warn("ACQ: DAQ reports no interrupt.")
ELSE
   !
   !   Inquire as to interrupt cause (subaddress @Srq):
   !      A contains interrupt information for surface data
   !         [should be 8192 (bit 13 set)]
   !      If B is non-zero, a DAQ error has been reported.
   !      C contains the number of armed card interrupts
   !         [Should be = 1!!]
   !      Sub-address @I1 contains the slot number(s) or interrupting
   !         card(s)...(This slot number should be that of memory card 2).
   !
   ENTER @Srq;A,B,C
   IF B>0 THEN
      !
      !   Errors reported: enter them and warn the operator...
      !
      FOR I=1 TO B
         ENTER @Errn;Err_num
         Warn("ACQ: DAQ error #"&VAL$(Err_num)&" reported.")
      NEXT I
   ELSE
      IF C<>0 THEN
         ENTER @I1;D
         IF D<>M2 THEN
            Warn("ACQ: Interrupt not by memory 2.")
         ELSE
            Spurious_int=0
            !
            !   Check memory 2's queue size (max=4096): if full, then
            !     memory has overflowed and data should be discarded,
            !     since there is no way to determine when the data was
            !     collected.  Else if less than or equal to one cycle
            !     (41) then data is current and current_mwd flag is set.
            !
            OUTPUT @Daq;"GI,RV,";M2;".1,T"
            !
            !   Daq is sometimes not fast enough to fill @Rv so skip
            !     if error on enter:
            !
            ON ERROR GOTO Skip_mem_check
            ENTER @Rv;Mem_stat
            IF Mem_stat>4080 THEN
               Warn("ACQ: DAQ memory overflowed and has been reset.")
               OUTPUT @Daq;"CC";M2;",T"          ! RESET MEMORY CARD
```

```
            OUTPUT @Daq;"GN"
            Dho_reset
          ELSE
            IF Mem_stat<=41 THEN Current_mwd=1
Skip_mem_check:  OFF ERROR
            OUTPUT @Daq;"GN"
            !
            !  Gather block of MWD readings.
            !    (Memory Input runs instantly -- even in serial mode.)
            !
            OUTPUT @Daq;"MI,";M1;",";Ocycle*Smplrate;"T"
            ENTER @Mi;Mwd(*)
            Mwdpresent=1
            Mwd_interrupt=1
            !
            !  Make mwd readings available to diagnostics.
            !
            MAT Diagmwd= Mwd
            Update=1
          END IF
        END IF
      END IF
      !
      !  Gather rig sensor readings if available.
      !
      IF BIT(A,13) THEN
        Spurious_int=0
        MAT Reading_time= (0)
        ON TIMEOUT 7,.2 GOTO Allin
        ON ERROR GOTO Allin
        FOR I=1 TO Ocycle
          !
          !  Gather RPM, Hook load, and Kelly Height counter
          !    card readings.
          !
          ENTER @Rv;Drevs(I),Hld0(I),Khght(I),Heave0(I)
          !
          !  Gather acquisition clock readings and convert to seconds.
          !
          ENTER @Rc;Days,Hours,Minutes,Seconds
          Reading_time(I)=86400.*Days+3600.*Hours+60*Minutes+Seconds
        NEXT I
        !
        !
        ! Daqtime err corr:
        !    First, find out what time the daq thinks has transpired
        !    and convert to seconds:
        !
        !
        OUTPUT @Daq;"RC,T"
        Timer=TIMEDATE
        ENTER @Rc;Days,Hrs,Minutes,Seconds
        Pres_daqtime=86400*Days+3600*Hrs+60*Minutes+Seconds
        !
        !
        !  Then, by comparison to what time the system thinks has
        !  transpired, a gain factor for the daqtimes can be found.
        !  If daq_gain is within 2% of unity, don't allow it to pass.
        !
        !
```

```
       Daq_gain=PROUND((Timer-Daqtime_set)/Pres_daqtime,-3)
       IF (Daq_gain<1.02 AND Daq_gain>0.98) THEN Daq_gain=1.
       !
       !  Daqtime corrections are made and Sample_intervals are
       !  calculated in CSUB Acqtime:
       !
       Acqtime(Daqclok(*),Reading_time(*),Sample_interval(*),Daq_gain,
                                                            Daqtime_set)
       !
Allin:!
       OFF ERROR
       Nrdgs=I-1
       !
       !  If clock has been reset, ignore this set of
       !     surface readings.
       !
       IF Clock_reset THEN
         Nrdgs=0
         Clock_reset=0
       END IF
       !
       !  If a full set of surface readings was not entered, warn
       !    the operator:
       !
       IF Nrdgs<>Ocycle AND Nrdgs>0 THEN
         Warn("ACQ: Surface reading loss detected.")
       END IF
       ON TIMEOUT 7,1 GOTO Deaddaq
       !
       ! Reset the daq's frequency clock so that cumulative error
       !  is avoided.  This is done before other outputs on @Daq
       !  so that there is no appreciable real time difference
       !  between the clock reset and the setting of the benchmark
       !  flag daqtime_set.
       !
       OUTPUT @Daq;"SC,0,0,0,0T"
       Daqtime_set=TIMEDATE
       !
       ! If klycd_calib has been set, then recalibrate kelly card
       !  before next data set is collected.....
       !
       IF Calib_klycd=1 THEN
         IF Change_ret_dir THEN Kelly_distance=-Kelly_distance
         OUTPUT @Daq;"GI,WC,";Kc;",";Kelly_distance;"T,GN"
         Calib_klycd=2
       ELSE
         IF Calib_klycd=2 THEN
           Suppress_change=2
           Calib_klycd=0
         END IF
       END IF
       !
       !  Refresh rig sensor instruction set.
       !
       OUTPUT @Daq;"WA,.2T"
       FOR I=1 TO Ncycle
         OUTPUT @Daq;Iseq$
       NEXT I
       !
```

```
        !  Tell daq to interrupt when it has completed its data
        !    collection tasks:
        !
        OUTPUT @Daq USING "K";"IN"
        !
      ELSE
        IF NOT Mwdpresent THEN
          Warn("ACQ: Interrupt not by surface sensors.")
        END IF
      END IF
    END IF
  END IF
  !
  !  Re-arm memory card 2, and re-enable the interrupts on bus 7.
  !
  IF Dev_table(Mru,State)=No_dev OR Mru_adj THEN
    OUTPUT @Daq;"GI,AC,";M2;"T,GN"
  ELSE
    Mwd_interrupt=1
  END IF
  SUBEXIT
  !
Deaddaq:!
  Warn("ACQ: DAQ timeout error")
  Spurious_int=1
SUBEND
```

TABLE 4

```
!---------------------------------------------------------------------!
!                                                                     !
! Name:      Analyze                                        No.       !
!                                                                     !
! Purpose:   Manages the filtering and interpretation of all acquired !
!            data.                                                    !
!                                                                     !
! Type:      Sub  program                                             !
!                                                                     !
! Invocation:                                                         !
!       Analyze(Mwd(*),Drev(*),Hv0(*),Hld0(*),Khght(*),Nrdgs,         !
!                  Mwdpresent,Current_mwd)                            !
!                                                                     !
!                                                                     !
! INTERFACE SUMMARY                                                   !
!        (Name)            (Type)              (Description)          !
! Input:                                                              !
!   Mwd(*)                                                            !
!   Drev(*)            Integer array      Revolutions for RPM         !
!   Hv0(*)             Integer array      Heave counts (mdepth)       !
!   Hld0(*)            Integer array      Hookload counts (WOB)       !
!   Khght(*)           Integer array      Kelly height counts         !
!   Nrdgs              Integer            Number of rdngs in arrays   !
!   Mwdpresent         Integer            Indicates downhole word     !
!   Current_mwd        Integer            Indicates no daq M2 backup  !
!                                                                     !
! Output:                                                             !
!     Writes to Prostat array                                         !
!                                                                     !
! Global Variables:                                                   !
!       COM /Bha/                                                     !
```

```
!       COM /Bitedge/
!       COM /Connection/
!       COM /Daqtime/
!       COM /Dnh_struct/
!       COM /Heave/
!       COM /Hold_flag/
!       COM /Kelly/
!       COM /Kellyswitch/
!       COM /Mtf/
!       COM /Process/
!       COM /Procstat/
!       COM /Rig_struct/
!       COM /Rop_filter/
!       COM /Systat/
!       COM /Wob/
!       COM /Uom/
!
!
! Global Constants:
!
!
! Modules Invoked:
!       Dnh_convert
!       FNCollar
!       FNUom
!       Mwdparse
!       Mwdparse_old
!       Process_status
!       Rig_convert
!       Warn
!
! Invoking Modules:
!       Dacqman
!
!-----------------------------------------------------------------
SUB Analyze(Mwd(*),INTEGER Drev(*),Hv0(*),Hld0(*),Khght(*),Nrdgs,
                                              Mwdpresent,Current_mwd)
Analyze:  !  Rev=1.42
   !
   !      Global Declarations:
   !
   COM /Bha/ Bitoff,Diroff,Gamoff,Resoff,Scrib,Toolconst,INTEGER Tooltype
   COM /Bitedge/ Sumx,Sumxx,Sumxy,Sumy,INTEGER Edgetime,Npts,Ovrlap
   COM /Connection/ INTEGER Connection
   COM /Daqtime/ Dclk(*),Daqtime_set,Smpl(*)
   COM /Dev_index/ INTEGER Bus,State,Crlim,Mnlim,Mxlim,Init
   COM /Dev_mon/ INTEGER Printer,Remote,Scratch,Strip,Digit,Mru,Daq
   COM /Dev_stat/ INTEGER Dev_query,Dev_nok,Dev_ok,No_dev
   COM /Dev_table/ INTEGER Dev_table(*)
   COM /Dnh_struct/ Dnh(*),INTEGER Dtime,Ddpth,Dazm,Dinc,Dref,Dgma,Dra
   COM /Dnh_struct/ INTEGER Ddtmp,Dast,Dtst,Dbpr,Dbtmp,Datmp,Ddpr,Dstat,Ddda
   COM /Dnh_struct/ INTEGER Dtmf,Damf,Dmud,Dhix,Dream,Dreph,Dretmp,Dtfbm,Dkstat
   COM /Downhole_type/ INTEGER Tool_status,Hist_index_word,Unused_18,Unused_19
   COM /Heave/ Hvsens_off,Td_off,T_off_time,INTEGER Hv_sns
   COM /Hold_flag/ INTEGER Hold
   COM /Kelly/ Md,Newsingle,Ropasm,S1
   COM /Kelly/ INTEGER Kdead,Kstat,Tstat,Observe,Kly_ret_dir
   COM /Kelly_height/ Kelly_height
   COM /Lmd/ Tac,Magnetic_declin,Grid_correction
   COM /Mtf/ Crossover,Last_azt,INTEGER Optional_id,Mag,Lsb_chk
```

```
COM /Mwdfmt/ Lbit,INTEGER Fmt(*),Fmtcnt,Fmtcode,Fmtptr,Pchk,Smplrate
COM /Periphm/ Bootup_time,Mru_elap_time,Mwd_msg_time,INTEGER Mru_is_400
COM /Process/ INTEGER Prostat(*)
COM /Procstat/ INTEGER Surface,Trans_complete,Word_complete
COM /Rev_klycd/ Kelly_distance,INTEGER Calib_klycd,Change_ret_dir
COM /Rig_struct/ Rig(*),INTEGER Rtime,Rdpth,Rrop,Rrpm,Rwob
COM /Rig_struct/ INTEGER Rropi,Rtorq,Rp1spm,Rp2spm,Rp1st,Rp2st,Rpres,Rgas
COM /Rig_struct/ INTEGER Rlstr,Rmdpth
COM /Rop_filter/ INTEGER S_chng,avg_reset
COM /Single/ Single(*),Dkd(*),Sl_correct(*),INTEGER S_ptr(*)
COM /Systat/ INTEGER Ncycle,Ocycle,Systart
COM /Wob/ Hook_i,Hook_s,L_frq,Rhomud,Wos
COM /Uom/ INTEGER Cunits(*),Udist,Udog,Urop,Uwght,Ugma,Ures,Ucon,Uangl
COM /Uom/ INTEGER Utemp,Urpm,Upres,Utorq,Ugapi,Uspm,Ucum,Ugas
COM /Uom/ INTEGER Udimless,Uflow,Umag,Utime,Ustrain,Uamp,Udens
COM /Uom/ INTEGER Ubit,Upgrad,U26,U27,U28,U29
COM /Uom/ INTEGER U30,U31,U32,U33,U34,U35
!
!    Local Declarations:
!
INTEGER Dnhid,Mrkrbit,Psw,Startword,Type
INTEGER C,W,Row,I,Collarsize,Temp_ptr,Q_size
INTEGER One,Two,Three
ALLOCATE K_to_r(1:Ocycle),INTEGER K_s(1:Ocycle)
One=1
Two=2
Three=3
Null=0
Dlim=3
Psw=0
MAT Prostat= (0)
Q_size=6
!
!   If surface data is present, then initialize the kelly status
!   and correct the kelly readings for sensor direction.
!
IF Nrdgs THEN
  K_s(1)=Kstat
  FOR I=1 TO Ocycle
    Khght(I)=Khght(I)*Kly_ret_dir
  NEXT I
  !
  ! Save previous string length for use with single length
  !    corrections later...
  !
  Temp_sl=Sl
  !
  !   Call Rig_convert, where the majority of surface data analysis
  !      will take place.  The final results of these analyses
  !      will be returned in the Rig array:
  !
  Rig_convert(Dclk(*),Prostat(*),Rig(*),Hld0(*),Drev(*),Hv0(*),
              Khght(*),Sl,Md,L_frq,Hook_i,Hook_s,Ropasm,Wos,
              Hvsens_off,Td_off,Hv_sns,Psw,Nrdgs,K_s(*),Tstat,
              Kdead,S_chng,C,W,Smpl(*),K_to_r(*))
  !
  ! Save some of the last values:
  !
  Kstat=K_s(Nrdgs)
```

```
Kelly_height=Khght(Nrdgs)/100
!
!   If a kelly retriever direction is to be changed, do so
!    and clear flag...
!
IF Change_ret_dir THEN
  Kly_ret_dir=-Kly_ret_dir
  Change_ret_dir=0
END IF
!
!       Update the Tagging array with the latest data:
!
Update_tag(K_s(*))
!
!       Check the warning flag from Rig_convert:
!
SELECT W
CASE 1
  Warn("KLY: Single Length Discrepancy")
CASE 2
  Warn("Kelly is out: system not in tripping")
CASE 3
  Warn("Kelly is being set back: system now in tripping")
END SELECT
!
!   If a connection was made, add the single length correction
!    factor to the string length.  For operator info.... save
!    the single length, Depth at kelly down (which is the string
!    length), and the single length correction factor applicable.
!
IF C>0 THEN
  Connection=1
  Warn("KLY: Connection was made")
  !
  !     Update queue end pointer
  !
  S_ptr(1)=S_ptr(1)+1
  !
  !     Update queue start pointer
  !
  IF S_ptr(1) MOD Q_size=S_ptr(0) THEN S_ptr(0)=(S_ptr(0)+1) MOD Q_size
  !
  !     Single length is calculated as the change in string length
  !
  Single(S_ptr(1) MOD Q_size)=Sl-Temp_sl
  !
  !     The single length correction factor is added to the stringlength
  !     at every connection.
  !
  Sl=Temp_sl+(Single(S_ptr(1) MOD Q_size)*Sl_correct(S_ptr(1) MOD Q_size))
  !
  !     Save the Depth at kelly down as a reference for the operator.
  !
  Dkd(S_ptr(1) MOD Q_size)=Sl
  !
  !     Save Single length correction to be applied at the next
  !     connection (Unless the operator alters the factor)
  !
```

```
      S1_correct((S_ptr(1)+1)MOD Q_size)=S1_correct(S_ptr(1) MOD Q_size)
      !
   END IF
   !
   !
   !
   !
   SELECT Observe
   CASE 1
      FOR I=1 TO Nrdgs
         Tempheave=Hv0(I)/100-Hvsens_off+Td_off
         IF Tempheave=-1.0 THEN Tempheave=-1.01
         Tempheave=FNUom(Udist,Tempheave)
         Tempkelly=FNUom(Udist,Khght(I)/100)
         Hld=Hld0(I)
         Temphook=FNUom(Uwght,Hld)
         Tempk_to_r=FNUom(Udist,K_to_r(I))
         PRINT USING "#,2(7A,4D.2D,2X)";"Kelly:",Tempkelly,"Heave:",Tempheave
         PRINT USING "#,13A,M3D.2D,2X";"Kly to riser:";Tempk_to_r
         PRINT USING "7A,M4D,X,A,D,A";"Hook:",Temphook;"[";K_s(I);"]"
      NEXT I
   CASE 2
      PRINT USING "5X,22A,M7D";"Hook load frequency:";L_frq
   END SELECT
END IF
IF Mwdpresent THEN
   !
   !  if mwd data from daq memory 2 is current (this acq cycle), update dnh
   !     time with system (daqclok) time, corrected for processing time;
   !  else update dnh time with the Ocycle, representing actual aquisition
   !     time:
   !
   IF Current_mwd THEN
      Dnh(1,Dtime)=Dclk(Nrdgs)-(Ocycle-Edgetime/Smplrate)
   ELSE
      Dnh(1,Dtime)=Dnh(1,Dtime)+Ocycle
   END IF
   !
   Collarsize=FNCollar
   IF Collarsize=0 THEN
      Warn("Collar size not available, default= 6 3/4")
      Collarsize=1
   END IF
   ALLOCATE Wordstat(1:2,1:3)
   IF Tooltype>1000 THEN
      Mwdparse(Mwd(*),Wordstat(*),Mrkrbit,Startword)
   ELSE
      Mwdparse_old(Mwd(*),Wordstat(*),Mrkrbit,Startword)
   END IF
   IF Mrkrbit THEN GOSUB Tag
   Dnhid=Wordstat(1,1)
   IF Dnhid>0 THEN
      IF Dnhid=Tool_status and Wordstat(1,2)>0 THEN
         Warn("MWD: Status bit set! Tool reports error.")
      END IF
      Psw=Psw+1
      Row=1
      Dnh_convert(Wordstat(1,2),Dnh(*),Tac,Scrib,Toolconst,Last_azt,Mag)
      Process_status(Psw,Word_complete,Dnhid,One,One,Prostat(*))
   END IF
   Dnhid=Wordstat(2,1)
```

```
    IF Dnhid=1 OR Startword THEN
       Psw=Psw+1
       Type=Null
       Process_status(Psw,Trans_complete,Type,One,One,Prostat(*))
       IF Startword THEN GOSUB Tag
    END IF
    IF Dnhid<0 THEN
       Psw=Psw+1
       Row=2
       Dnh_convert(Wordstat(2,2),Dnh(*),Tac,Scrib,Toolconst,Last_azt,Mag)
       Row=3
       Dnh_convert(Wordstat(2,3),Dnh(*),Tac,Scrib,Toolconst,Last_azt,Mag)
       Process_status(Psw,Word_incomplete,Dnhid,Two,Three,Prostat(*))
    END IF
    DEALLOCATE Wordstat(*)
 END IF
 Psw=Psw+1
 Type=Null
 Process_status(Psw,End_of_cycle,Type,One,One,Prostat(*))
 DEALLOCATE K_to_r(*),K_s(*)
 SUBEXIT
Tag:!
 Psw=Psw+1
 Type=Null
 Process_status(Psw,Marker,Type,One,One,Prostat(*))
 IF Dev_table(Mru,State)<>No_dev AND Bootup_time>0 THEN
    Matchtime=Bootup_time+Mru_elap_time+Mwd_msg_time
 ELSE
    Matchtime=Dnh(1,Dtime)
 END IF
 IF Matchtime>TIMEDATE THEN Matchtime=TIMEDATE ! Don't allow proc in future!
 FOR I=1 TO Dlim
    Dnh(I,Dtime)=Matchtime
 NEXT I
 RETURN
SUBEND
```

TABLE 5

```
(*---------------------------------------------------------------------*)
(*                                                                     *)
(* Name:  Rig_convert                                    No.           *)
(*                                                                     *)
(* Purpose:  Performs the rig sensor group analysis                    *)
(*                                                                     *)
(* Type:  CSUB                                                         *)
(*                                                                     *)
(* Invocation:  Rig_convert(daqclok,prostat,rig,hld0,drevs,heave,      *)
(*                          khght,slenght,mdpth,daqtime,last_hookfreq, *)
(*                          hook_intercept,hook_slope,ropasm,wos,      *)
(*                          sensor_offset,tidal_offset,                *)
(*                          heave_sense,nrdgs,klystat,tripstat,klydead,*)
(*                          suppress_change,conn_flag,warn_flag        *)
(*                          sample_interval,kelly_to_riser)            *)
(*                                                                     *)
(* INTERFACE SUMMARY                                                   *)
(*      (Name)              (Type)              (Description)          *)
(* Input:                                                              *)
(*    daqclok             daqclok_type        Contains 10 daq times    *)
(*    prostat             prostat_type        The prostat array        *)
```

```
(*    rig                rig_array_type   The rig array              *)
(*    hld0               ocycle_type      Contains last 5 hookload   *)
(*                                         readings                  *)
(*    drevs              ocycle_type      Contains last 5 rotary     *)
(*                                         revolution counts         *)
(*    heave              ocycle_type      Contains last 5 heave      *)
(*                                         readings                  *)
(*    khght              ocycle_type      Contains last 5 kelly height*)
(*                                         readings                  *)
(*    slength            real             The string length          *)
(*    mdpth              real             The measured depth         *)
(*    daqtime            real             The dacqtime               *)
(*    last_hookfreq      real             The last hook load frequency*)
(*    hook_intercept     real             The calculated hook        *)
(*                                         intercept                 *)
(*    hook_slope         real             The calculated hook slope  *)
(*    ropasm             real             The assumed rop value      *)
(*    wos                real             The string weight          *)
(*    sensor_offset      real             Heave sensor zeroing offset *)
(*    tidal_offset       real             Correction to perm datum for*)
(*                                         tidal variations          *)
(*    heave_sense        bintvaltype      Pos/neg heave direction    *)
(*    nrdgs              real             The number of readings in a *)
(*                                         cycle                     *)
(*    klystat            ocycle_type      Klystat[1] contains the last*)
(*                                         kelly state               *)
(*    tripstat           bintvaltype      The current tripstat       *)
(*    klydead            bintvaltype      Flag to indicate to use    *)
(*                                         assumed rop               *)
(*    suppress_change    bintvaltype      Flag to indicate if rop    *)
(*                                         values are valid          *)
(*    conn_flag          bintvaltype      (See output)               *)
(*    warn_flag          bintvaltype      (See output)               *)
(*    sample_interval    daqclok_type     Real array, daq reading time*)
(*                                         intervals, corrected to   *)
(*                                         system time               *)
(*    kelly_to_riser     kbuf_type        (see output)               *)
(*                                                                   *)
(*                                                                   *)
(* Output:                                                           *)
(*    prostat            prostat_type     The prostat array          *)
(*    rig                rig_array_type   The rig array              *)
(*    slength            real             The string length          *)
(*    mdpth              real             The measured depth         *)
(*    klystat            kstat_type       Contains the last 5 kelly  *)
(*                                         states                    *)
(*    tripstat           bintvaltype      The current tripstat       *)
(*    conn_flag          bintvaltype      Indicates a connection made *)
(*                                         in depth algorithm.       *)
(*    warn_flag          bintvaltype      Indicates a single length  *)
(*                                         discrepency found in depth *)
(*                                         algorithm.                *)
(*    kelly_to_riser     kbuf_type        Real array used to return  *)
(*                                         the last_position values  *)
(*                                         from this acq set.        *)
(*                                                                   *)
(* Global Variables:                                                 *)
(*    kellyset           real             The kelly height at the    *)
(*                                         inslips state             *)
(*    kelly_hist         hvfilter_type    Array of last kelly readings*)
(*    heave_hist         hvfilter_type    Array of last heave readings*)
```

```
(*    sumy               real              Heave linear regr. parameter*)
(*    sumxy              real              Heave linear regr. parameter*)
(*    last_position      real              Last kelly to riser position*)
(*    pointer            integer           kelly & heave hist. pointer *)
(*                                                                     *)
(* Global Constants:                                                   *)
(*    surface            integer                                       *)
(*    revs_per_min       integer                                       *)
(*    rop_time_avg       integer                                       *)
(*    wght_on_bit        integer                                       *)
(*    rrop               integer           index into rig array        *)
(*    rwob               integer           index into rig array        *)
(*    rdpth              integer           index into rig array        *)
(*    rtime              integer           index into rig array        *)
(*    rropi              integer           index into rig array        *)
(*                                                                     *)
(* Files Included:                                                     *)
(*    none                                                             *)
(*                                                                     *)
(* Modules Invoked:                                                    *)
(*    Fn_hook_load                                                     *)
(*    Calc_depth                                                       *)
(*    Process_status                                                   *)
(*    Fn_wob                                                           *)
(*    Fn_instant_rop                                                   *)
(*    Fn_rop                                                           *)
(*    Fn_rpm                                                           *)
(*    Correct_heave                                                    *)
(*    Comp_heave                                                       *)
(*    Brake_heave                                                      *)
(*                                                                     *)
(* Invoking Modules:                                                   *)
(*    Analyze                                                          *)
(*                                                                     *)
(*-------------------------------------------------------------------- *)

(1)
procedure Rig_convert( dimenlen1: dimentryptr; var daqclok: daqclok_type;
                       dimenlen2: dimentryptr; var prostat: prostat_type;
                       dimenlen3: dimentryptr; var rig: rig_array_type;
                       dimenlen4: dimentryptr; var hld0: ocycle_type;
                       dimenlen5: dimentryptr; var drevs: ocycle_type;
                       dimenlen6: dimentryptr; var heave: ocycle_type;
                       dimenlen7: dimentryptr; var khght: ocycle_type;
                       var slength: real;
                       var mdpth: real;
                 var last_hookfreq: real;
                 var hook_intercept: real;
                      var hook_slope: real;
                         var ropasm: real;
                            var wos: real;
                  var sensor_offset: real;
                    var tidal_offset: real;
                     var heave_sense: bintvaltype;
                            var psw: bintvaltype;
                          var nrdgs: bintvaltype;
                       dimenlen8: dimentryptr; var klystat: kstat_type;
                        var tripstat: bintvaltype;
                        var klydead: bintvaltype;
                 var suppress_change: bintvaltype;
```

```
                var conn_flag: bintvaltype;
                var warn_flag: bintvaltype;
                    dimenlen9: dimentryptr;
            var sample_interval: daqclok_type;
                    dimenlen10: dimentryptr;
              var kelly_to_riser: kbuf_type);

var       temp: real;
    last_depth: real;        { used when using assumed rop }
       deltime: real;
      bitdepth: real;
            kh: real;
       heave_i: real;
            hv: real;
      velocity: real;
 brake_setting: real;
 surface_types: bintvaltype;
         index: integer;
           row: bintvaltype;
          hook: bintvaltype;
         kstat: bintvaltype;
       ext_ptr: bintvaltype;
         dnhid: bintvaltype;
        dimlen: dimentryptr;
      hold_rop: boolean;
     set_kelly: boolean;
          conn: boolean;
 just_hit_bottom: boolean;

begin

{ initialize appropriate variables  } kstat := klystat[1];

conn_flag:=0;
warn_flag:=0;
ext_ptr:=surface;
surface_types:=0;

if suppress_change >= 1 then begin
   if suppress_change > 1 then
      set_kelly := true
   else
      set_kelly := false;
   hold_rop := true;
   suppress_change := 0;
   end
 else begin
   hold_rop := false;
   set_kelly := false;
   end;

(2) for index := 1 to nrdgs do begin

{ calculate individual measurement times. Store the time tag }
   { of rig sensor data in the rig sensor data table.           }
```

```
(3)  deltime := daqclok[index] - daqclok[index-1];
     rig[index,rtime]:= daqclok[index];

{ convert the hook load sensor pulses to hook load in      }
     { kilonewtons, log the last hook load frequency in case the }
     {                background needs to calibrate.             }

(4)  hld0[index]:= Fn_hook_load(last_hookfreq,hld0,index, hook_intercept,
                                hook_slope,sample_interval);
     { retain last measured depth (for later ROP calculation)    } last_depth:=mdpth;

{ depth algorithm : calculate measured depth from height sensor }
     { and hook load sensor measurements.                            }
     { calculate total measured depth from kelly height and hook     }
     { load sensor measurements                                      }

(5)  if (klydead = 1) then begin
        klystat[index]:=0;
        if hold_rop = false then
           mdpth:=last_depth + ropasm * deltime;
        rig[index,rdpth]:=mdpth;
        end
     else begin
(6)     hook:= hld0[index];
        kh:= khght[index] / 100;
        heave_i:= heave[index]/100;

{ if a heave sensor is active (heave_sense is non-zero) then  }
     { prepare heave and kelly data for use in depth calculation   }
     { by correcting the heave reading to mean sea level in        }
     { Correct_heave and then feed the result into the Linear      }
     { Extrapolative Filter, via Comp_heave                        }

(7)     if heave_sense <> 0 then
           begin (8)        hv:= Correct_heave(heave_i,sensor_offset,
                              tidal_offset,heave_sense);

(9)        Comp_heave(kh,hv,velocity);

{ just_hit_bottom is boolean to check whether or not drilling }
     { is about to commence and will determine usage of the heave  }
     { braking function....                                        }

(10)       just_hit_bottom := ((kstat<>0) and (hook > lowload) and
                   ((slength-last_position)>=mdpth));

{ decide whether to use brake by checking tripping, kelly     }
     { recalibration, just_hit_bottom, and the present drilling    }
     { velocity as returned from Comp_heave                        }

(11)       if ((just_hit_bottom and (velocity<-0.005)) or set_kelly)
               and (tripstat < 1) then
```

```
         { determine the appropriate brake setting depending upon    }
         { whether or not the kelly is being recalibrated (set_kelly) }
         { and then call the braking function (Brake_heave)          } begin

(12)             if set_kelly then
                     brake_setting := kh + hv
                 else
                     brake_setting:=slength - mdpth;

(13)             Brake_heave(brake_setting,kh,hv);

end;

end else begin
           last_position := kh + heave_i;
           hv := heave_i;

end; { if heave_sense < > 0 } kstat:= klystat[index];

{ call procedure calc_depth, which will process these readings }
    { and return a calculated total depth (bitdepth) as well as    }
    { updated kelly and tripping status markers and connection and }
    { warning flags                                                }

(14)     calc_depth(kh,hook,hv,
                    kstat,tripstat,
                    slength,mdpth,bitdepth,
                    conn,warn_flag);

{ transfer results into appropriate arrays for later analyses }
    { and displays                                                }

(15)     kelly_to_riser[index] := last_position;
         klystat[index]:=kstat;
         rig[index,rdpth]:=bitdepth;

if conn then conn_flag:=1;   {set flag if connection occurs} end;      { if klydead }

{ set kelly status for next call to calc_depth with current }
    { kelly status array of kelly status used for observe display. } if index< nrdgs then
            klystat[index+1]:=klystat[index];
    { convert hookload measurement into weight on bit            } rig[index,rwob]:= fn_wob(wos,klystat[index],hld0[index]);

{ get rop update in system units                             } rig[index,rropi]:= fn_instant_rop(hold_rop,mdpth,daqclok[index]);
```

```
    rig[index,rrop] := fn_rop(hold_rop,mdpth,daqclok[index],
                                        deltime,klystat[index]);

if not hold_rop then suppress_change:=0;

{ convert rotary table revolutions to rpm.                        } rig[index,rrpm]:=fn_rpm(drevs,index,sample_interval);

{ transfer results of surface parameter calculations into the  }
{ prostat array via calls to process_status                    } cp:=(cp+1) MOD minute;

row:= index;

if rig[index,rrop] <> -1 then
    begin
    psw:=psw +1;
    dnhid:=rop_time_avg;
    surface_types:= surface_types + 1;
    process_status(psw,ext_ptr,dnhid,row,
                surface_types,dimlen,prostat);
    end;

if rig[index,rwob] <> -1 then
    begin
    psw:=psw +1;
    dnhid:=wght_on_bit;
    surface_types:= surface_types + 1;
    process_status(psw,ext_ptr,dnhid,row,
                surface_types,dimlen,prostat);
    end;

if rig[index,rrpm] <> -1 then
    begin
    psw:=psw +1;
    dnhid:=revs_per_min;
    surface_types:= surface_types + 1;
    process_status(psw,ext_ptr,dnhid,row,
                surface_types,dimlen,prostat);
    end;
   if rig[index,rropi] <> -1 then
    begin
    psw:=psw+1;
    dnhid:=rop_instant;
    surface_types:= surface_types + 1;
    process_status(psw,ext_ptr,dnhid,row,
                surface_types,dimlen,prostat);
    end;

{ place the number of types of surface readings into prostat  }
{ array at the 'first' psw pointer for each reading.          } if surface_types > 0 then
        prostat[psw-(surface_types-1),3] := surface_types;

surface_types := 0;
```

(16)
```
    end;     { for index = 1 to nrdgs }
end; {rig_convert}
```

TABLE 6

```
(*------------------------------------------------------------*)
(*                                                            *)
(* Name:         Correct_heave                      No.       *)
(*                                                            *)
(* Purpose:      This routine corrects the heave reading to the *)
(*               permanent datum before use in depth calculation *)
(*                                                            *)
(* Type:         Re-entrant function                          *)
(*                                                            *)
(* Invocation:   CALL Correct_heave(Heave,Sensor_offset,      *)
(*                                  Tidal_offset,Heave_sense) *)
(*                                                            *)
(*                                                            *)
(*                                                            *)
(*                                                            *)
(* INTERFACE SUMMARY                                          *)
(*       (Name)          (Type)         (Description)         *)
(* Input:                                                     *)
(*                                                            *)
(*    Heave             real         Heave reading from DAQ   *)
(*    Sensor_offset     real         Offset between initial and *)
(*                                   calibrated zero heave lines *)
(*    Tidal_offset      real         Offset from zero heave to *)
(*                                   permanent datum          *)
(*    Heave_sense       bintvaltype  Pos/neg heave sensor direction *)
(*                                                            *)
(* Output:                                                    *)
(*                                                            *)
(*    Correct_heave     real         The corrected heave value for *)
(*                                   depth calculations       *)
(*                                                            *)
(* Global Variables:                                          *)
(*    < none >                                                *)
(*                                                            *)
(* Invoking Modules:                                          *)
(*          Rig_convert                                       *)
(*                                                            *)
(*------------------------------------------------------------*)

Function Correct_heave (var Heave,
                        Sensor_offset,
                        Tidal_offset          : real;
                        var Heave_sense       : bintvaltype): real;

begin

Correct_heave:=(Heave_sense*Heave) - Sensor_offset + Tidal_offset end;
```

TABLE 7

```
{---------------------------------------------------------------------}
{ Name:         Comp_heave                                            }
{                                                                     }
{ Purpose:   This routine compensates for errors in the apparent      }
{            kelly-to-riser position due to uncompensated heave.      }
{                                                                     }
{            The method used is a simple linear regression, with      }
{            time as the independent variable and the kelly_to_riser  }
{            position as the dependent variable.                      }
{                                                                     }
{ Type:         Re-entrant subroutine                                 }
{                                                                     }
{ Invocation:   Comp_heave (Kelly, Heave,Slope)                       }
{                                                                     }
{                                                                     }
{ INTERFACE SUMMARY                                                   }
{     (Name)             (Type)           (Description)               }
{ Input:                                                              }
{                                                                     }
{   Kelly               real        The last kelly heigth readings    }
{                                                                     }
{   Heave               real        The last heave reading, corrected }
{                                       for sensor and tidal offsets. }
{ Output:                                                             }
{                                                                     }
{   kelly_hist          Hvfilter_type    Latest kelly height readings }
{                       (real array)                                  }
{                                                                     }
{   heave_hist          Hvfilter_type    Latest corrected heave rdngs }
{                                                                     }
{   Sumy                real        The sum of the kelly-to-riser     }
{                                       positions. (The calling routine }
{                                       doesn't do anything with this; }
{                                       it just needs to be retained  }
{                                       from call to call.)           }
{                                                                     }
{   Sumxy               real        The sum of the kelly-to-riser *   }
{                                       time readings. (Needs to be   }
{                                       retained from call to call)   }
{                                                                     }
{   Last_position       real        The filtered last position of     }
{                                       the kelly_to_riser. This is the }
{                                       primary output of the routine. }
{                                   The calling routine must retain   }
{                                       it from call to call.         }
{                                                                     }
{   Pointer             integer     A pointer that points to the      }
{                                       next position in the kelly and }
{                                       heave histories.              }
{                                       (Globally retained from call  }
{                                       to call.)                     }
{                                                                     }
{   Slope               real        An indicator of the heave change  }
{                                       velocity, used outside of this }
{                                       routine to check for need of  }
{                                       heave braking.                }
```

```
{                                                                          }
{                                                                          }
{ Global Constants:                                                        }
{                                                                          }
{    hvfilter_interval    integer      Length of the kelly and heave       }
{                                      histories.                          }
{                                                                          }
{ Global Variables:                                                        }
{                                                                          }
{    kelly_hist           (as above)                                       }
{                                                                          }
{    heave_hist           (as above)                                       }
{                                                                          }
{    sumy                 (as above)                                       }
{                                                                          }
{    sumxy                (as above)                                       }
{                                                                          }
{    last_position        (as above)                                       }
{                                                                          }
{    pointer              (as above)                                       }
{                                                                          }
{ Invoking Modules:                                                        }
{    Rig_convert                                                           }
{    Brake_heave                                                           }
{                                                                          }
{--------------------------------------------------------------------------}

Procedure Comp_heave ( var Kelly    : real;
                       var Heave    : real;
                       var Slope    : real);

var

Position_in_range : boolean;
        Intercept,
        Kelly_to_riser,
        Proj_position,
        Sumx,
        Sumxx              : real;
begin (1) Kelly_to_riser := Kelly + Heave ;

(*   Wrap the circular array pointer around the array.                 *)

(2) Pointer := (Pointer mod hvfilter_interval) + 1 ;

(*                                                                      *)
(*   Because time arbitrarily runs from 1 to hvfilter_interval,         *)
(*   Sumx and Sumxx for the linear regression are easily computed:      *)
(*                                                                      *)
```

```
{*                    n                                              *}
{*                    E x  =  n (n+1) / 2                            *}
{*                   x=1                                             *}
{*                                                                   *}
{*                    n  2                                           *}
{*                    E x   =  n (n+1) (2n+1) / 6                    *}
{*                   x=1                                             *}
{*                                                                   *}
```

(3) Sumx:= hvfilter_interval * (hvfilter_interval + 1) / 2 ;
    Sumxx := hvfilter_interval * (hvfilter_interval + 1)
                        * (2 * hvfilter_interval + 1) / 6 ;

```
{*                                                                   *}
{* Calculate the new Sumxy and Sumy, using the new kelly_to_riser    *}
{* value. Note that a numeric short-cut is used here. The newest    *}
{* reading always occurs at time = hvfilter_interval, because the   *}
{* time used arbitrarily runs from time= 1 to hvfilter_interval.    *}
{* Based on that, subtracting Sumy from Sumxy effectively            *}
{* re-calculates Sumxy for time = 2 to hvfilter_interval - 1.       *}
{*                                                                   *}
```

(4) Sumxy     := Sumxy - Sumy + Kelly_to_riser * hvfilter_interval ;

Sumy      := Sumy - (kelly_hist[Pointer] + heave_hist[Pointer]) +
                  Kelly_to_riser ;
(5) Slope     := (Sumx * Sumy / hvfilter_interval - Sumxy)
                  /(Sumx * Sumx / hvfilter_interval - Sumxx) ;
    Intercept:= (Sumy / hvfilter_interval)
                       - (Slope * Sumx / hvfilter_interval) ;

```
{*                                                                   *}
{* The projected position is now computed and compared to the       *}
{* last position.  If the new position is above the old position,   *}
{* but not more than 1 m above and the apparent velocity (slope)    *}
{* is under .05 m/sec, then the routine assumes that uncompensated  *}
{* heave is to blame. It "clamps" the on-bottom position by         *}
{* reporting the last projected position. If the projected          *}
{* position is fairly high or is moving fast, the routine assumes   *}
{* the driller is actually coming off bottom, and does not clamp.   *}
{*                                                                   *}
```

(6) Proj_position := Slope * hvfilter_interval + Intercept ;

(7) if (Proj_position > Last_position)
            and (Proj_position < Last_position+1) then
       Position_in_range := TRUE
    else
       Position_in_range := FALSE ;

(8) if Position_in_range and (Slope < 0.5) then
       Last_position := Last_position
    else
       Last_position := Proj_position ;

(9) kelly_hist[Pointer] := Kelly;
    heave_hist[Pointer] := Heave;
end;

TABLE 8

```
{*-----------------------------------------------------------------*}
{*                                                                 *}
{*Name:        Brake_heave      No.                                *}
{*                                                                 *}
{*Purpose:     This routine fills the kelly_hist array and the     *}
{*             heave_hist arrays with the values that triggered the*}
{*             brake call and forces last_postion to the specified *}
{*             brake setting.  Dampens linear regressive filter in *}
{*             Comp_heave to prevent its momentum from making false*}
{*             depth.                                              *}
{*                                                                 *}
{*Type:        Re-entrant subroutine                               *}
{*                                                                 *}
{*Invocation:  Brake_heave ( Brake_setting, Kelly, Heave )         *}
{*                                                                 *}
{*                                                                 *}
{*INTERFACE SUMMARY                                                *}
{*       (Name)           (Type)          (Description)            *}
{*Input:                                                           *}
{*                                                                 *}
{*   Brake_setting        Real       The kelly_to_riser position at*}
{*                                   which depth will be held.     *}
{*                                   (meters,0<=Bs<30)             *}
{*   Kelly                Real       Kelly height reading which was*}
{*                                   present at the time the brake *}
{*                                   was triggered (meters,0<=Kh<30)*}
{*                                                                 *}
{*   Heave                Real       Heave reading which was present*}
{*                                   at the time the brake was     *}
{*                                   triggered (meters,-10<Hv<10)  *}
{*                                                                 *}
{*Output:                                                          *}
{*                                                                 *}
{*Global Variables:                                                *}
{*                                                                 *}
{*   Last_position        Real       Kelly_to_riser value returned by*}
{*                                   Comp_heave (meters)           *}
{*Global Constants:                                                *}
{*                                                                 *}
{*   hvfilter_interval    Integer    Number of readings in heave/kelly*}
{*                                   history arrays                *}
{*                                                                 *}
{*Modules Invoked:                                                 *}
{*    Comp_heave                                                   *}
{*                                                                 *}
{*Invoking Modules:                                                *}
{*    CSUB Rig_convert                                             *}
{*                                                                 *}
{*-----------------------------------------------------------------*}

Procedure Brake_heave ( Brake_setting : real;
                        Kelly : real;
                        Heave : real);

var
        I      : integer ;
        Slope  : real;
```

```
begin (*                                                                        *)
(* Note that the Last_position is forced to the brake setting on each call.*)
(*                                                                        *)

for I := 1 to hvfilter_interval do
      begin

Last_position := Brake_setting;
      Comp_heave (Kelly, Heave, Slope);

end;

Last_position := Brake_setting;

end;
```

TABLE 9

```
(*------------------------------------------------------------------*)
(*                                                                  *)
(* Name:  Calc_depth                              No.               *)
(*                                                                  *)
(* Purpose: Provides interface between Rig_convert and Depth_status *)
(*          for depth tracking and calculations.                    *)
(*                                                                  *)
(* Type:    Procedure                                               *)
(*                                                                  *)
(* Invocation:   Calc_Depth ( kelly_height,hookload,heave,kstat,    *)
(*                            tstat,stringlength,mdepth,bit_depth   *)
(*                            conn,warn )                           *)
(*                                                                  *)
(*                                                                  *)
(* INTERFACE SUMMARY                                                *)
(*       (Name)          (Type)           (Description)             *)
(* Input:                                                           *)
(*    kelly_height       real             The kelly reading in meters*)
(*    hookload           integer          The new hook load reading *)
(*    heave              real             The zeroed heave reading  *)
(*    kstat              integer          The last kelly state      *)
(*    tstat              integer          The current tripstat      *)
(*    stringlength       real             the drill string length   *)
(*    mdepth             real             the measured depth        *)
(*    bit_depth          real             the bit depth             *)
(*    conn               bintvaltype      flag for connections      *)
(*    warn               bintvaltype      (see output)              *)
(*                                                                  *)
(* Output:                                                          *)
(*                                                                  *)
(*    kstat              bintvaltype array  last 5 kelly states     *)
(*    tstat              bintvaltype        current tripstat        *)
(*    stringlength       real               the drill string length *)
(*    mdepth             real               the measured depth      *)
(*    bit_depth          real               the bit depth           *)
(*    conn               boolean            flag for connections    *)
(*    warn               bintvaltype        flag for single length  *)
(*                                          discrepency or tripstat *)
(*                                          change                  *)
```

```
(*                                                              *)
(* Global Variables:                                             *)
(*     none                                                      *)
(*                                                              *)
(* Global Constants:                                             *)
(*     none                                                      *)
(*                                                              *)
(* Modules Invoked:                                              *)
(*     Depth_status                                              *)
(*                                                              *)
(* Invoking Modules:                                             *)
(*     Rig_convert                                               *)
(*                                                              *)
(*                                                              *)
(*--------------------------------------------------------------*)

{ Calc_Depth    Rev=1.3 }

Procedure Calc_Depth ( kelly_height : real;
                                hookload : bintvaltype;
                                   heave : real;
                           var   kstat : bintvaltype;
                           var   tstat : bintvaltype;
                           var stringlength : real;
                           var mdepth : real;
                           var bit_depth : real;
                                var conn : boolean;
                                var warn : bintvaltype);

var   kellystat : kellystat_type;
           tripstat  : tripstat_type;

Begin
        case kstat of
           0 : kellystat := on_bottom;

1 : kellystat := off_bottom;

2 : kellystat := out_of_hole;

3 : kellystat := in_slips;

4 : kellystat := making_connection;
         end;

case tstat of
           0 : tripstat := not_tripping;

1 : tripstat := tripping;

2 : tripstat := trip_out;
```

```
      3 : tripstat := trip_in;
   end;

Depth_status(kelly_height, hookload,heave,
              kellystat, tripstat,
              stringlength, mdepth, bit_depth,
              conn, warn);

case kellystat of
      on_bottom     : kstat := 0;

off_bottom    : kstat := 1;

out_of_hole   : kstat := 2;

in_slips      : kstat := 3;

making_connection: kstat := 4;
     end;

case tripstat of
      not_tripping : tstat := 0;

{ All trip states are forced into tstat=1 until trip tracking }
      { is fully implemented.} tripping     : tstat := 1;

trip_out     : tstat := 1;

trip_in      : tstat := 1;
    end;

End;
```

TABLE 10

```
(*----------------------------------------------------------------*)
(*                                                                *)
(* Name:      Depth_status                            No.         *)
(*                                                                *)
(* Purpose:   This algorithm 1) calculates bitdepth, 2) updates   *)
(*            the kelly status and the tripping status,           *)
(*            3) updates measured depth while drilling,           *)
(*            4) tracks the stringlength, 5) maintains the        *)
(*            kelly buffer of the last 5 kelly heights, and       *)
(*            6) sends warnings back to caller to indicate:       *)
(*               a connection, a descrepancy in the new single    *)
(*               length.                                          *)
(*                                                                *)
(*                                                                *)
(* Type:      Subroutine                                          *)
(*                                                                *)
(* Invocation: Depth_status(kelly_height,hookload,heave,          *)
(*                          kellystat,tripstat,                   *)
(*                          stringlength,mdepth,bit_depth,        *)
(*                          connection,warn)                      *)
(*                                                                *)
```

```
(*  INTERFACE SUMMARY                                                          *)
(*        (Name)              (Type)          (Description)                    *)
(* Input:                                                                      *)
(*    kelly_height            real            The kelly height in meters.      *)
(*                                                                             *)
(*    hook_load               integer         The hookload in force.           *)
(*                                                                             *)
(*    heave                   real            The heave magnitude in meters.   *)
(*                                                                             *)
(*    kellystat               kellystat_type  The status as determined by the  *)
(*                                            kelly height and the hookload.   *)
(*                                                                             *)
(*    tripstat                tripstat_type   The tripping current status.     *)
(*                                                                             *)
(*    stringlength            real            The current stringlength.        *)
(*                                            (includes the length of the kelly)*)
(*                                                                             *)
(*    mdepth                  real            The last measured depth.         *)
(*                                                                             *)
(*    bit_depth               real            Variable to return bit depth     *)
(*                                                                             *)
(* ptr_kelly_buffer           integer         The current pointer to next      *)
(*                                            available space in the kellybuffer*)
(*                                                                             *)
(*    kelly_buffer            kbuf_type       Contains the kelly heights for   *)
(*                                            the last 5 seconds.              *)
(*                                                                             *)
(*    connection              boolean         Variable to indicate if a        *)
(*                                            connection has been made.        *)
(*                                                                             *)
(*    warn                    bintvaltype     (see output)                     *)
(*                                                                             *)
(* Output:                                                                     *)
(*    kellystat               kellystat_type  The updated kelly status.        *)
(*                                                                             *)
(*    tripstat                tripstat_type   The updated tripping mode.       *)
(*                                                                             *)
(*    stringlength            real            The updated stringlength.        *)
(*                                                                             *)
(*    mdepth                  real            The updated measured depth.      *)
(*                                                                             *)
(*    bit_depth               real            The calculated bit depth.        *)
(*                                                                             *)
(*    kellyset                real            The kelly height at "in slips".  *)
(*                                                                             *)
(*    ptr_kelly_buffer        integer         The pointer to the circular kelly*)
(*                                            buffer.                          *)
(*                                                                             *)
(*    kelly_buffer            kbuf_type       Buffer of last 5 kelly heights.  *)
(*                                                                             *)
(*    connection              boolean         Variable to indicate connection  *)
(*                                            made at current status.          *)
(*                                                                             *)
(*    warn                    bintvaltype     Variable to indicate whether     *)
(*                                            there is a single measurement    *)
(*                                            discrepancy during the last      *)
(*                                            connection, or whether trip      *)
(*                                            states are changing.             *)
(*                                                                             *)
```

```
(* Global Variables:                                                        *)
(*                                                                          *)
(*    depth_sensor         sensor_type    kelly_sensor, block_sensor.       *)
(*                                                                          *)
(*    highload             real           The high hookload in force.       *)
(*                                                                          *)
(*    last_position        real           Heave compensated kelly height    *)
(*                                                                          *)
(*    lowload              real           The low hookload in force.        *)
(*                                                                          *)
(*    kellyset             real           The last kelly set as determined  *)
(*                                        from the kelly height at inslips  *)
(*                                        state.                            *)
(*                                                                          *)
(* Invoking Modules:                                                        *)
(*    Calcdepth                                                             *)
(*                                                                          *)
(*                                                                          *)
(*--------------------------------------------------------------------------*)

{   Depth_status: Rev=1.9   }

Procedure Depth_status(     kelly_height  : real;
                            hookload      : bintvaltype;
                            heave         : real;
                        var kellystat     : kellystat_type;
                        var tripstat      : tripstat_type;
                        var stringlength  : real;
                        var mdepth        : real;
                        var bit_depth     : real;
                        var connection    : boolean;
                        var warn          : bintvaltype );

const   in_marker = 3;   { kelly height marker for making connection } var statset :
        kellystat_type;
        out_marker : real;
        connection_marker :
        real; tripset :
        tripstat_type;

{ Subprocedure Calc_new_string:  Update drillstring length with      }
{                                latest added pipe length.           } procedure Calc_new_string;

var         i, ptr : integer;
        sum, newsingle : real;

begin ptr := (ptr_kelly_buffer MOD 5) + 1;
```

```
newsingle := kelly_buffer[ptr] - kellyset;

if depth_sensor <> varco_sensor then begin
   sum := 0;
   for i := 1 to 3 do begin
       sum := sum + kelly_buffer[ptr];
       ptr := (ptr mod 5) + 1;
       end;

if abs( (sum/3) - (newsingle + kellyset) ) >= 0.03 then
       warn := 1;
   end;

stringlength := stringlength + newsingle;
   if  tripstat > not_tripping then
          if (newsingle < -14) then
             tripstat := trip_out else if  (newsingle > 14) then
             tripstat := trip_in;

end;     (procedure calc_new_string)

{ Subprocedure Calc_bit_depth:   Calculates the current total
{                                bit depth procedure Calc_bit_depth;

begin if tripstat = tripping then begin
      bit_depth := 0;
      if hookload < lowload then
         kellystat := in_slips
      else
         kellystat := off_bottom;
   end     { if tripstat=tripping } else if kellystat < in_slips  then
         bit_depth := stringlength - last_position
      else
         bit_depth := stringlength - kellyset - heave;

if bit_depth < 0 then bit_depth := 0;

end; {procedure calc_bit_depth}

{=========== main depth algorithm =============================}

BEGIN

Kelly_buffer[ptr_kelly_buffer] := kelly_height;
tripset := tripstat;

Case depth_sensor of
```

```
    kelly_sensor : begin
                    if (tripstat >= tripping)
                       and (kelly_height > 10) then
                            tripstat := not_tripping else if (tripstat >= tripping) then
                            kellystat := off_bottom;

out_marker:=7;
                    connection_marker:=7;
                    end;

block_sensor : begin
                    out_marker:=7;
                    connection_marker:=7;
                    end;

varco_sensor : begin
                    out_marker:=0.5;
                    connection_marker:=7;
                    end;

end; { case }

Connection := false;

Repeat
  statset := kellystat;

calc_bit_depth;

CASE kellystat of on_bottom      : begin if bit_depth < (mdepth - ob_buff)
                           then kellystat := off_bottom;

{ distinguish entering rathole and making hole } if (tripstat = not_tripping)
                           and (bit_depth > mdepth)
                           and (hookload > lowload) then Mdepth := bit_depth;
                        end;

off_bottom     : begin
                        if kelly_height >= out_marker then
                           kellystat := out_of_hole;

if bit_depth >= (mdepth - ob_buff) then
                           kellystat := on_bottom;
                        end;
```

```
out_of_hole    : if hookload < lowload then
                   begin
                   kellystat := in_slips;
                   kellyset := kelly_height;
                   end else
                   if ((kelly_height < out_marker)
                       and (tripstat = not_tripping))
                       or (bit_depth >= (mdepth - ob_buff))
                                            then kellystat := off_bottom;

in_slips       : if (abs(kelly_height - kellyset) > connection_marker)
                   and (hookload < lowload) then kellystat := making_connection else begin if hookload > highload then
                       kellystat := off_bottom;

if (hookload < lowload)
                       and (kelly_height < in_marker)
                       and (tripstat = not_tripping)
                       and (depth_sensor = kelly_sensor)
                                              then
                       tripstat := tripping;
                   end;

making_connection : if (hookload < lowload)
                       and (kelly_height < in_marker)
                       and (tripstat = not_tripping) then tripstat := tripping else
                       if hookload > highload then begin connection := true;
                           calc_new_string;
                           kellystat := off_bottom;
                           end;

End; { CASE of kellystat } until (kellystat = statset);

ptr_kelly_buffer := (ptr_kelly_buffer  mod 5) + 1;
```

```
if ( tripstat <> tripset ) then
    if (tripstat < tripping) then
        warn := 2
    else
        if (tripstat = tripping) and (tripset = not_tripping) then
            warn := 3;

END;   {depth_status}
```

While preferred embodiments have been shown and described, various modifications and substitutions may be made thereto without departing from the spirit and scope of the invention has been described by way of illustrations and not limitation.

What is claimed is:

1. A method for removing uncompensated heave from drillstring depth calculations on a floating drilling platform, the drilling platform communicating with a drilling riser attached to the sea floor, the platform also including a kelly and a heave compensation system, including the steps of:
   measuring kelly movements with respect to time to obtain a plurality of kelly height sensor readings;
   measuring heave compensation movements with respect to time to obtain a plurality of heave sensor readings;
   adding each kelly height sensor reading to each corresponding heave sensor reading to obtain a plurality of values defined as kelly-to-riser values;
   performing a linear regression on said kelly-to-riser values over a pre-selected time interval;
   generating a trend line from the said linear regression wherein a current kelly-to-riser position is predicted from said trend line.

2. The method of claim 1 including the step of:
   calculating bit depth from said current kelly-to-riser position predicted from said trend line.

3. The method of claim 1 including the step of:
   calculating rate of penetration from said current kelly-to-riser position predicted from said trend line.

4. The method of claim 1 wherein said linear regression comprises the step of:
   performing a least squares analysis.

5. The method of claim 4 wherein said least squares analysis utilizes the four summation equations comprising:

(1) $Sumx = [(interval) \times (interval + 1)] \div 2$ (2) $Sumxx = [(interval) \times (interval + 1)] \times (2 \times (interval) + 1)] \div 6$ (3) $Sumxy = Sumxy - Sumy + (kelly\text{-}to\text{-}riser \times interval)$ (4) $Sumy = Sumy - [Kelly\,(pointer) + heave\,(pointer)] + Kelly\text{-}to\text{-}riser$ Where:

| | |
|---|---|
| Sumx, Sumxx, Sumy, Sumxy = | Least squares sums |
| Interval = | Filter sample interval = (hvfilter-interval) |
| Kelly-to-riser = | Current kelly added to heave |
| Kelly (*) = | History of kelly readings |
| Heave (*) = | History of heave readings |
| Pointer = | Current position within kelly and heave histories |

6. The method of claim 5 wherein slope and intercept of said trend line is determined utilizing the equations comprising:

(5) $Slope = \{[(Sumx) \times (Sumy) \div (interval)] - Sumxy\} \div \{[(Sumx) \times (Sumxy) \div (interval)] - Sumxx\}$ (6) $Intercept = [(Sumy) \div (interval)] - [(slope) \times (Sumx) \div (interval)]$ Where:
   Slope = slope of trend line
   Intercept = intercept of trend line 7. The method of claim 1 wherein:
   said kelly height sensor readings and said heave sensor readings are measured on one second intervals.

8. The method of claim 1 wherein:
   said pre-selected time interval comprises a whole number of heave periods.

9. The method of claim 8 wherein:
   said preselected time interval comprises three heave periods of ten seconds each.

10. The method of claim 1 wherein:
    said pre-selected time interval comprises 30 seconds.

11. The method of claim 1 including the step of:
    calibrating said trend line by inputting tidal data and rig ballast information.

12. The method of claim 11 including the step of:
    correcting said heave sensor readings to mean sea levels.

13. The method of claim 1 wherein said step of generating said trend line includes the step of:
    removing measured kelly movements which are due to uncompensated heave movements.

14. The method of claim 1 including the step of:
    dampening said linear regression to prevent false current kelly-to-riser positions predicted from said trend line.

15. An apparatus for removing uncompensated heave from drillstring depth calculations on a floating drilling platform, the drilling platform communicating with a drilling riser attached to the sea floor, the platform also including a kelly and a heave compensation system, including the steps of:
    means for measuring kelly movements with respect to time to obtain a plurality of kelly height sensor readings;
    means for measuring heave compensation movements with respect to time to obtain a plurality of heave sensor readings;
    means for adding each kelly height sensor reading to each corresponding heave sensor reading to obtain a plurality of values defined as kelly-to-riser values;
    means for performing a linear regression on said kelly-to-riser values over a pre-selected time interval;

means for generating a trend line from the said linear regression wherein a current kelly-to-riser position is predicted from said trend line.

16. The apparatus of claim 15 including:
means for calculating bit depth from said current kelly-to-riser position predicted from said trend line.

17. The apparatus of claim 15 including:
means for calculating rate of penetration from said current kelly-to-riser position predicted from said trend line.

18. The apparatus of claim 15 wherein said means for performing linear regression includes:
means for performing a least squares analysis.

19. The apparatus of claim 18 wherein said least squares analysis utilizes the four summation equations comprising:

(1) $\text{Sumx} = [(\text{interval}) \times (\text{interval} + 1)] \div 2$ (2) $\text{Sumxx} = [(\text{interval}) \times (\text{interval} + 1) \times (2 \times (\text{interval}) + 1)] \div 6$ (3) $\text{Sumxy} = \text{Sumxy} - \text{Sumy} + (\text{kelly-to-riser} \times \text{interval})$ (4) $\text{Sumy} = \text{Sumy} - [\text{Kelly (pointer)} + \text{heave (pointer)}] + \text{Kelly-to-riser}$ Where:

| | |
|---|---|
| Sumx, Sumxx, Sumy, Sumxy = | Least squares sums |
| Interval = | Filter sample interval = (hvfilter-interval) |
| Kelly-to-riser = | Current kelly added to heave |
| Kelly (*) = | History of kelly readings |
| Heave (*) = | History of heave readings |
| Pointer = | Current position within kelly and heave histories |

Where:

| | |
|---|---|
| Sumx, Sumxx, Sumy, Sumxy = | Least squares sums |
| Interval = | Filter sample interval = (hvfilter-interval) |
| Kelly-to-riser = | Current kelly added to heave |
| Kelly (*) = | History of kelly readings |
| Heave (*) = | History of heave readings |
| Pointer = | Current position within kelly and heave histories |

20. The apparatus of claim 19 wherein slope and intercept of said trend line is determined utilizing the equations comprising:

(5) $\text{Slope} = \{[(\text{Sumx}) \times (\text{Sumy}) \div (\text{interval})] - \text{Sumxy}\} \div \{[(\text{Sumx}) \times (\text{Sumxy}) \div (\text{interval})] - \text{Sumxx}\}$ (6) $\text{Intercept} = [(\text{Sumy}) \div (\text{interval})] - [(\text{slope}) \times (\text{Sumx}) \div (\text{interval})]$ Where:
Slope = slope of trend line
Intercept = intercept of trend line 21. The apparatus of claim 15 including:
means for measuring said kelly height sensor readings and said heave sensor readings on one second intervals.

22. The apparatus of claim 15 wherein:
said pre-selected time interval comprises a whole number of heave periods.

23. The apparatus of claim 22 wherein:
said preselected time interval comprises three heave periods of ten seconds each.

24. The apparatus of claim 15 wherein:
said pre-selected time interval comprises 30 seconds.

25. The apparatus of claim 15 including:
means for calibrating said trend line by inputting tidal data and rig ballast information.

26. The apparatus of claim 25 including:
means for correcting said heave sensor readings to mean sea levels.

27. The apparatus of claim 15 wherein said means for generating a trend line includes:
means for removing measured kelly movements which are due to uncompensated heave movements.

28. The apparatus of claim 15 including:
means for dampening said linear regression to prevent false current kelly-to-riser positions predicted from said trend line.

* * * * *